US012223371B2

(12) United States Patent
Guim Bernat et al.

(10) Patent No.: US 12,223,371 B2
(45) Date of Patent: Feb. 11, 2025

(54) TECHNOLOGIES FOR SCALING INTER-KERNEL TECHNOLOGIES FOR ACCELERATOR DEVICE KERNELS

(71) Applicant: Intel Corporation, Santa Clara, CA (US)

(72) Inventors: Francesc Guim Bernat, Barcelona (ES); Karthik Kumar, Chandler, AZ (US); Susanne M. Balle, Hudson, NH (US); Mark D. Tetreault, Millbury, MA (US)

(73) Assignee: Intel Corporation, Santa Clara, CA (US)

( * ) Notice: Subject to any disclaimer, the term of this patent is extended or adjusted under 35 U.S.C. 154(b) by 893 days.

(21) Appl. No.: 17/033,303

(22) Filed: Sep. 25, 2020

(65) Prior Publication Data

US 2021/0011787 A1    Jan. 14, 2021

(51) Int. Cl.
*G06F 9/46* (2006.01)
*G06F 9/54* (2006.01)
G06F 9/48 (2006.01)
G06F 9/50 (2006.01)

(52) U.S. Cl.
CPC ............ *G06F 9/547* (2013.01); *G06F 9/4881* (2013.01); *G06F 9/5027* (2013.01); *G06F 2209/501* (2013.01)

(58) Field of Classification Search
CPC ....................................................... G06F 9/547
USPC ......................................................... 718/102
See application file for complete search history.

(56) References Cited

U.S. PATENT DOCUMENTS

| | | | |
|---|---|---|---|
| 8,368,424 B1* | 2/2013 | Han ................. | H03K 19/17772 326/38 |
| 8,739,171 B2* | 5/2014 | Krishnamurthy ....... | G06F 9/505 718/104 |
| 10,241,885 B2* | 3/2019 | Guim Bernat ..... | H03K 19/1776 |
| 10,445,118 B2* | 10/2019 | Guo ...................... | G06F 9/4552 |
| 10,579,547 B2* | 3/2020 | Balle ................... | G06F 13/1615 |
| 10,585,816 B1* | 3/2020 | Lambert .............. | G06F 13/122 |
| 10,678,737 B2 | 6/2020 | Balle et al. | |
| 10,984,275 B1* | 4/2021 | Campbell ........ | H04N 21/42202 |
| 11,151,192 B1* | 10/2021 | Campbell ............. | G06V 20/58 |
| 11,334,960 B2* | 5/2022 | Totolos, Jr. ........... | G01S 17/931 |
| 11,416,542 B1* | 8/2022 | Campbell ............. | H04N 7/188 |
| 11,527,057 B2* | 12/2022 | Chua ................... | G06F 18/2415 |
| 2010/0095152 A1* | 4/2010 | Darrington ......... | G06F 11/1438 714/19 |
| 2010/0156458 A1* | 6/2010 | Speers ............. | H03K 19/17772 326/39 |

(Continued)

*Primary Examiner* — Mehran Kamran
(74) *Attorney, Agent, or Firm* — Fletcher Yoder, P.C.

(57) ABSTRACT

Systems and methods for inter-kernel communication using one or more semiconductor devices. The semi-conductor devices include a kernel. The kernel may be in an inactive state unless performing an operation. One kernel of a first device may monitor data for an event. Once an event has occurred, the kernel sends an indication to a first inter-kernel communication circuitry. The inter-kernel communication circuitry determines an activation function of a plurality of activation functions is to be generated, generates the activation function, and transmits the activation function to a second kernel of a second device to waken and perform a function using a peer-to-peer connection.

20 Claims, 23 Drawing Sheets

(56) References Cited

U.S. PATENT DOCUMENTS

| | | | |
|---|---|---|---|
| 2013/0103961 A1* | 4/2013 | Brooks | G06F 1/3278 |
| | | | 713/320 |
| 2017/0195339 A1* | 7/2017 | Brown | H04W 4/80 |
| 2018/0026868 A1* | 1/2018 | Guim Bernat | H04L 41/12 |
| | | | 370/252 |
| 2018/0150334 A1* | 5/2018 | Bernat | G06F 13/4027 |
| 2019/0043207 A1* | 2/2019 | Carranza | G06V 20/52 |
| 2019/0065260 A1* | 2/2019 | Balle | H04L 41/0816 |
| 2019/0138464 A1* | 5/2019 | Balle | G06F 13/1652 |
| 2019/0228648 A1* | 7/2019 | Moustafa | G08G 1/09675 |
| 2020/0076878 A1* | 3/2020 | Whited | G06F 16/29 |
| 2020/0112917 A1* | 4/2020 | Nam | H04W 72/23 |
| 2020/0359216 A1* | 11/2020 | Akpinar | H04W 4/024 |
| 2021/0011787 A1* | 1/2021 | Guim Bernat | G06F 9/542 |
| 2021/0081347 A1* | 3/2021 | Liao | G06F 9/5066 |
| 2021/0119632 A1* | 4/2021 | Zhu | G01R 31/318519 |
| 2021/0182200 A1* | 6/2021 | Liao | G06F 12/0862 |
| 2021/0237734 A1* | 8/2021 | Buburuzan | G08G 1/096791 |
| 2021/0343149 A1* | 11/2021 | Peng | B60W 50/14 |
| 2021/0406893 A1* | 12/2021 | Calvert | G06Q 20/204 |
| 2022/0101037 A1* | 3/2022 | Chua | G06F 18/2415 |
| 2022/0188095 A1* | 6/2022 | Chen | G07C 5/008 |

\* cited by examiner

TECHNOLOGIES FOR SCALING INTER-KERNEL TECHNOLOGIES FOR ACCELERATOR DEVICE KERNELS

BACKGROUND

Accelerator devices, such as field programmable gate arrays (FPGAs), may be configured (e.g., by a bit stream defining a configuration of gates of the FPGA) to perform a set of functions, referred to herein as a kernel. The kernel may be configured, through time consuming effort on the part of a kernel developer, to establish a connection with another accelerator device kernel (e.g., another kernel in the same FPGA, a kernel in another FPGA, or a kernel of another type of accelerator device, such as a graphics processing unit (GPU), etc.) and share data with that other kernel to facilitate the completion of a workload (e.g., a set of operations that are to be performed). Typically, details of the communication protocol must be set out in the kernel by the kernel developer and, as the primary purpose of the kernel is to perform a set of operations (e.g., the workload) as efficiently as possible, the communication aspect of the kernel may be limited to communicating with a single type of accelerator device kernel if that accelerator device kernel happens to be available on a certain type of communication path (e.g., a PCIe bus). While some data centers may utilize pools of disaggregated resources (e.g., accelerator devices) available through various types of communication paths, also referred to I/O channels or communication channels, a given accelerator device kernel may be unable to access (e.g., cooperatively execute a workload with) a large percentage of those other accelerator devices due to the limited communication faculties of the accelerator device kernel to communicate in a peer-to-peer manner.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF SPECIFIC EMBODIMENTS

Figure 1:
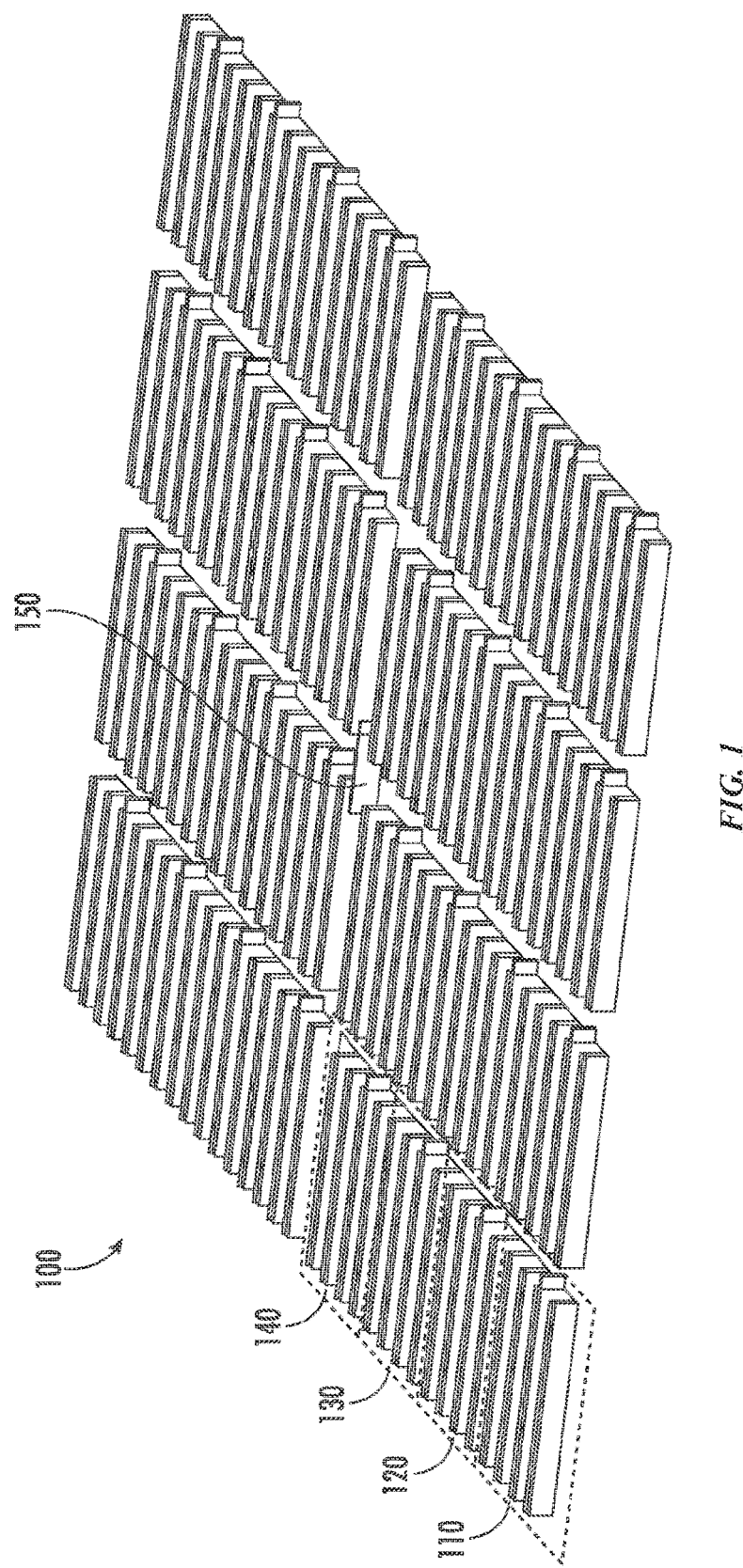
FIG. 1 is a simplified diagram of at least one embodiment of a data center for executing workloads with disaggregated resources, in accordance with an embodiment of the disclosure.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims. When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the forms of "at least one of A, B, and C," "at least one of A, B, or C," or "A or B" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

There are many scenarios where conditional, real-time, low latency responses from connected clients may be useful. "Conditional" indicates that a response is generated only when there is a specific action or threshold has been reached (e.g., temperature is greater than 40° C.). For example, a drone could be capturing surveillance footage continuously, but, only under some circumstances, the drone may request confirmation from a street monitor/camera before flagging an alarm. The circumstances to be confirmed may include a camera of the drone detecting a potential anomaly or a specific car (e.g., wanted) using a license plate/color/make of the car).

In such scenarios, a programmable logic device (PLD) (e.g., a field-programmable gate array (FPGA)) on the drone may transmit information (e.g., an activation function) to a PLD in a one or more connected cameras on the street to perform a specific task with high precision and accuracy— maybe for example, using an algorithm to confirm or recognize a car. The PLD may also want to perform the confirmation as fast as possible, with sub-response times, as the car is moving fast, and an alarm is to be flagged quickly if a match is found.

In some other scenario, a drone may flag some other event with the drone's FPGA/PLD connecting to FPGAs/PLDs/ other circuitry on local cameras, sensors, other drones, and/or other processing resources. Using these situations or other implementations, PLDs may utilize an ultra-low latency compute, and peer-to-peer "activation functions" for tasks to activate and share operations with other computing resources. For example, the activation function may be a specific image match algorithm to double-check some aspect of the car/driver by the local camera. Another example may be a multi-cast of the same activation function to multiple resources (e.g., local cameras) based on the trajectory that the drone observes the car to be taking. To enable casting of the activation function, the PLDs may utilize a peer-to-peer activation of functions from one PLD to another while performing the functions with ultra-low latency response times without using secondary servers. In some embodiments, inter-kernel communication may be callable from OpenCL and/or register-transfer level (RTL).

Referring now to FIG. 1, a data center 100 in which disaggregated resources may cooperatively execute one or more workloads (e.g., applications on behalf of customers) includes multiple pods 110, 120, 130, 140, each of which includes one or more rows of racks. Of course, although data center 100 is shown with multiple pods, in some embodiments, the data center 100 may be embodied as a single pod. As described in more detail herein, each rack houses multiple sleds, each of which may be primarily equipped with a particular type of resource (e.g., memory devices, data storage devices, accelerator devices, general purpose processors), i.e., resources that can be logically coupled to form a composed node, which can act as, for example, a server. In the illustrative embodiment, the sleds in each pod 110, 120, 130, 140 are connected to multiple pod switches (e.g., switches that route data communications to and from sleds within the pod). The pod switches, in turn, connect with spine switches 150 that switch communications among pods (e.g., the pods 110, 120, 130, 140) in the data center 100. In some embodiments, the sleds may be connected with a fabric using Intel Omni-Path technology. In other embodiments, the sleds may be connected with other fabrics, such as InfiniBand or Ethernet. As described in more detail herein, resources within sleds in the data center 100 may be allocated to a group (referred to herein as a "managed node") containing resources from one or more sleds to be collectively utilized in the execution of a workload. The workload can execute as if the resources belonging to the managed node were located on the same sled. The resources in a managed node may belong to sleds belonging to different racks, and even to different pods 110, 120, 130, 140. As such, some resources of a single sled may be allocated to one managed node while other resources of the same sled are allocated to a different managed node (e.g., one processor assigned to one managed node and another processor of the same sled assigned to a different managed node).

A data center including disaggregated resources, such as data center 100, can be used in a wide variety of contexts, such as enterprise, government, cloud service provider, and communications service provider (e.g., Telco's), as well in a wide variety of sizes, from cloud service provider mega-data centers that consume over 100,000 sq. ft. to single- or multi-rack installations for use in base stations.

The disaggregation of resources to sleds including a single type of resource (e.g., compute sleds including primarily compute resources, memory sleds containing primarily memory resources), and the selective allocation and deallocation of the disaggregated resources to form a managed node assigned to execute a workload improves the operation and resource usage of the data center 100 relative to typical data centers including hyper converged servers containing compute, memory, storage and perhaps additional resources in a single chassis. For example, because sleds predominantly contain resources of a particular type, resources of a given type can be upgraded independently of other resources. Additionally, because different resources types (processors, storage, accelerators, etc.) typically have different refresh rates, greater resource utilization and reduced total cost of ownership may be achieved. For example, a data center operator can upgrade the processors throughout their facility by only swapping out the compute sleds. In such a case, accelerator and storage resources may not be contemporaneously upgraded and, rather, may be allowed to continue operating until those resources are scheduled for their own refresh. Resource utilization may also increase. For example, if managed nodes are composed based on requirements of the workloads that will be running on them, resources within a node are more likely to be fully utilized. Such utilization may allow for more managed nodes to run in a data center with a given set of resources, or for a data center expected to run a given set of workloads, to be built using fewer resources.

Figure 2:
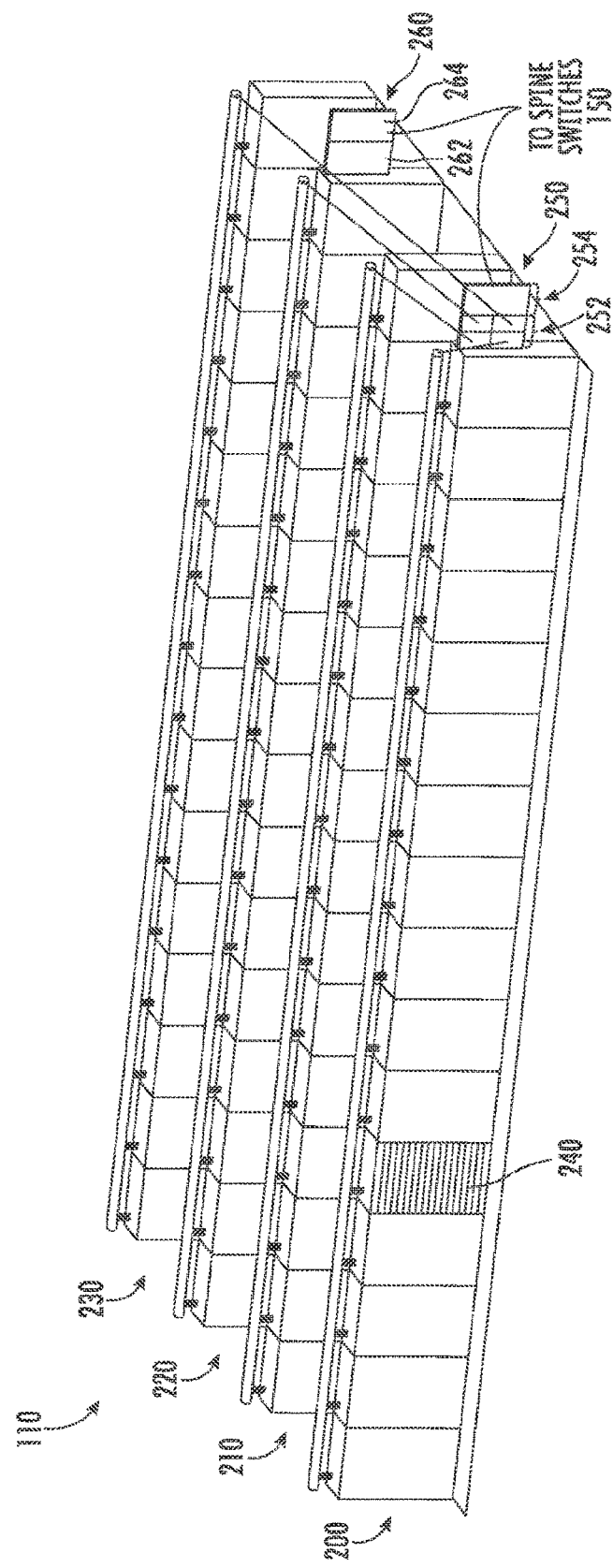
FIG. 2 is a simplified diagram of at least one embodiment of a pod that may be included in the data center of FIG. 1, in accordance with an embodiment of the disclosure.

Referring now to FIG. 2, the pod 110, in the illustrative embodiment, includes a set of rows 200, 210, 220, 230 of racks 240. Each rack 240 may house multiple sleds (e.g., sixteen sleds) and provide power and data connections to the housed sleds, as described in more detail herein. In the illustrative embodiment, the racks in each row 200, 210, 220, 230 are connected to multiple pod switches 250, 260. The pod switch 250 includes a set of ports 252 to which the sleds of the racks of the pod 110 are connected and another set of ports 254 that connect the pod 110 to the spine switches 150 to provide connectivity to other pods in the data center 100. Similarly, the pod switch 260 includes a set of ports 262 to which the sleds of the racks of the pod 110 are connected and a set of ports 264 that connect the pod 110 to the spine switches 150. As such, the use of the pair of switches 250, 260 provides an amount of redundancy to the pod 110. For example, if either of the switches 250, 260 fails, the sleds in the pod 110 may still maintain data communication with the remainder of the data center 100 (e.g., sleds of other pods) through the other switch 250, 260. Furthermore, in the illustrative embodiment, the switches 150, 250, 260 may be embodied as dual-mode optical switches, capable of routing both Ethernet protocol communications carrying Internet Protocol (IP) packets and communications according to a second, high-performance linklayer protocol (e.g., Intel's Omni-Path Architecture's, InfiniBand, PCI Express) via optical signaling media of an optical fabric.

It should be appreciated that each of the other pods 120, 130, 140 (as well as any additional pods of the data center 100) may be similarly structured as, and have components similar to, the pod 110 shown in and described in regard to FIG. 2 (e.g., each pod may have rows of racks housing multiple sleds as described above). Additionally, while two pod switches 250, 260 are shown, it should be understood that in other embodiments, each pod 110, 120, 130, 140 may be connected to a different number of pod switches, providing even more failover capacity. Of course, in other embodiments, pods may be arranged differently than the rows-of-racks configuration shown in FIGS. 1-2. For example, a pod may be embodied as multiple sets of racks in which each set of racks is arranged radially, i.e., the racks are equidistant from a center switch.

Figure 3:
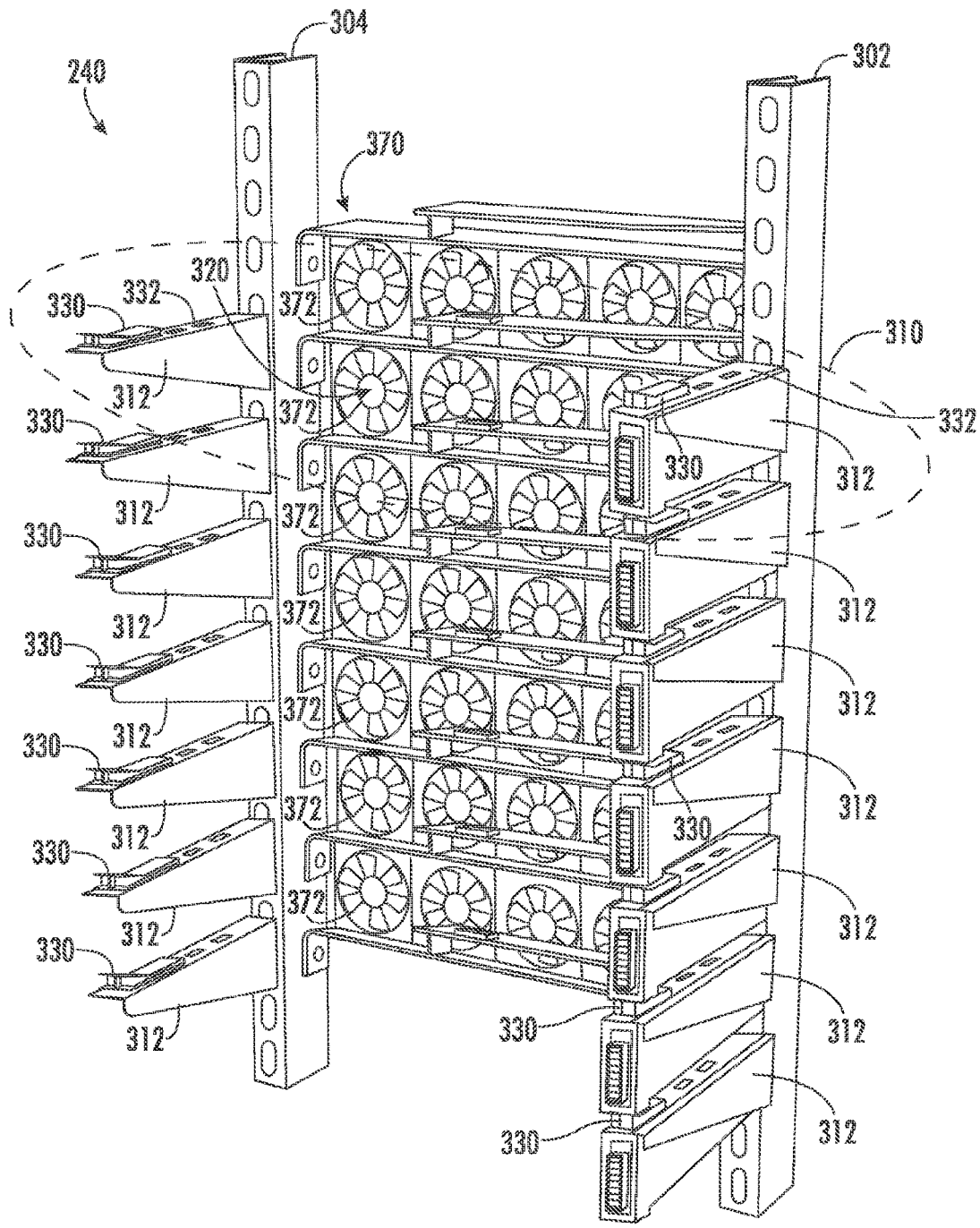
FIG. 3 is a perspective view of at least one embodiment of a rack that may be included in the pod of FIG. 2, in accordance with an embodiment of the disclosure.
Figure 4:
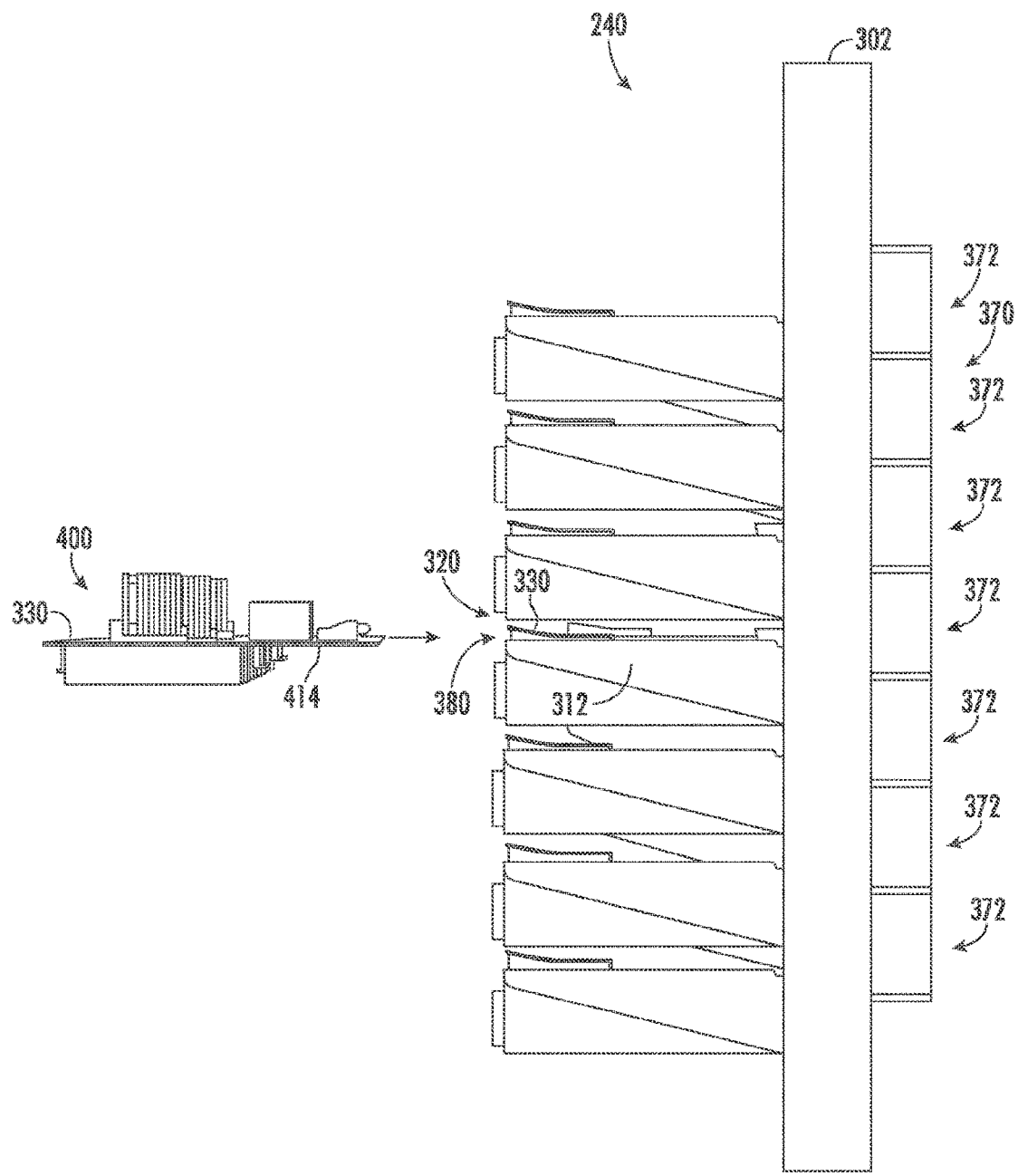
FIG. 4 is a side elevation view of the rack of FIG. 3, in accordance with an embodiment of the disclosure.
Figure 5:
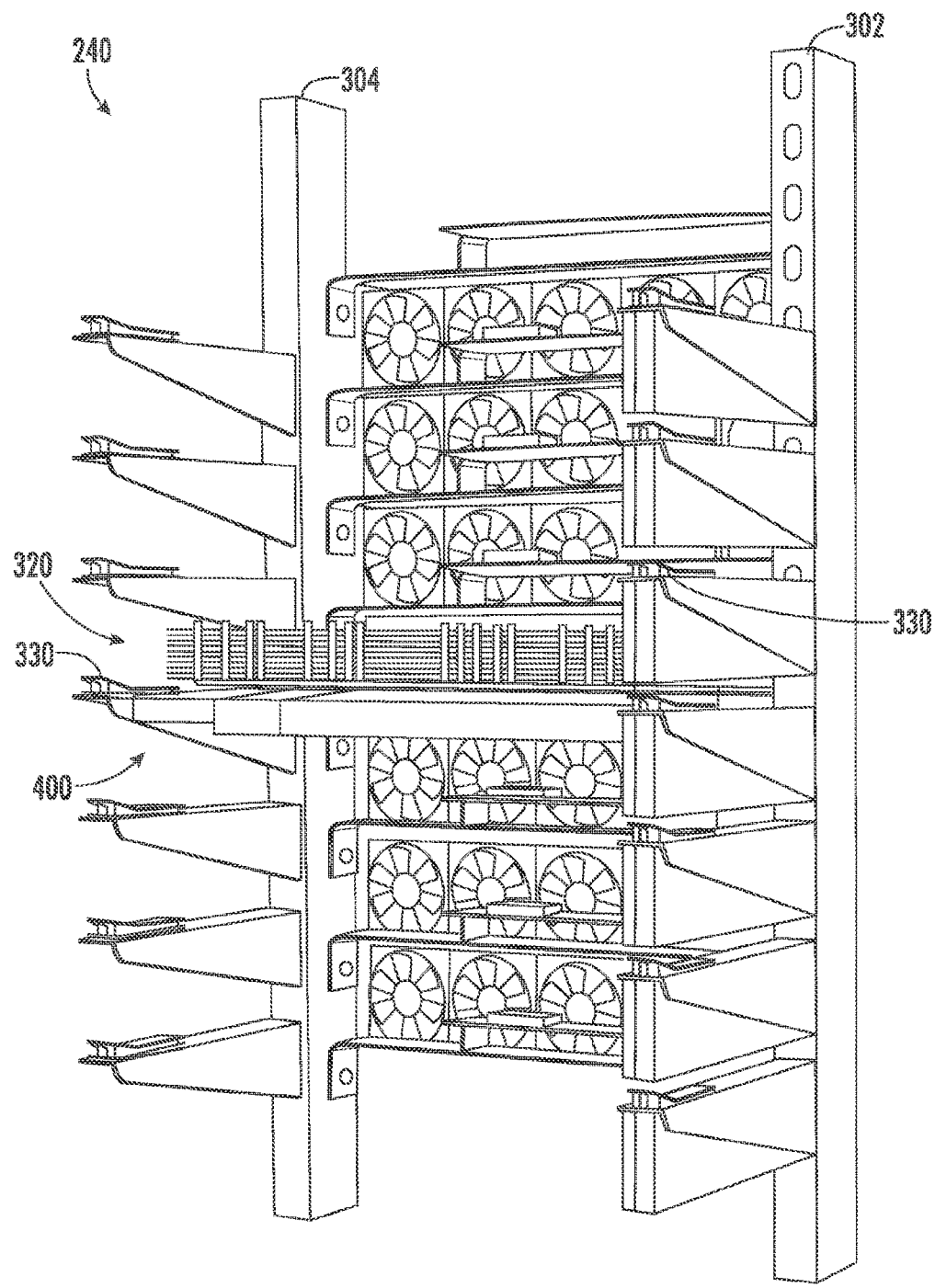
FIG. 5 is a perspective view of the rack of FIG. 3 having a sled mounted therein, in accordance with an embodiment of the disclosure.

Referring now to FIGS. 3-5, each illustrative rack 240 of the data center 100 includes two elongated support posts 302, 304, which are arranged vertically. For example, the elongated support posts 302, 304 may extend upwardly from a floor of the data center 100 when deployed. The rack 240 also includes one or more horizontal pairs 310 of elongated support arms 312 (identified in FIG. 3 via a dashed ellipse) configured to support a sled of the data center 100 as discussed below. One elongated support arm 312 of the pair of elongated support arms 312 extends outwardly from the elongated support post 302 and the other elongated support arm 312 extends outwardly from the elongated support post 304.

In the illustrative embodiments, each sled of the data center 100 is embodied as a chassis-less sled. That is, each sled has a chassis-less circuit board substrate on which physical resources (e.g., processors, memory, accelerators, storage, etc.) are mounted as discussed in more detail below. As such, the rack 240 is configured to receive the chassis-less sleds. For example, each pair 310 of elongated support arms 312 defines a sled slot 320 of the rack 240, which is configured to receive a corresponding chassis-less sled. To do so, each illustrative elongated support arm 312 includes a circuit board guide 330 configured to receive the chassis-less circuit board substrate of the sled. Each circuit board guide 330 is secured to, or otherwise mounted to, a top side 332 of the corresponding elongated support arm 312. For example, in the illustrative embodiment, each circuit board guide 330 is mounted at a distal end of the corresponding elongated support arm 312 relative to the corresponding elongated support post 302, 304. For clarity of the Figures, not every circuit board guide 330 may be referenced in each Figure.

Each circuit board guide 330 includes an inner wall that defines a circuit board slot 380 configured to receive the chassis-less circuit board substrate of a sled 400 when the sled 400 is received in the corresponding sled slot 320 of the rack 240. To do so, as shown in FIG. 4, a user (or robot) aligns the chassis-less circuit board substrate of an illustrative chassis-less sled 400 to a sled slot 320. The user, or robot, may then slide the chassis-less circuit board substrate forward into the sled slot 320 such that each side edge 414 of the chassis-less circuit board substrate is received in a corresponding circuit board slot 380 of the circuit board guides 330 of the pair 310 of elongated support arms 312 that define the corresponding sled slot 320 as shown in FIG. 4. By having robotically accessible and robotically manipulable sleds including disaggregated resources, each type of resource can be upgraded independently of each other and at their own optimized refresh rate. Furthermore, the sleds are configured to enable blind mating with power and data communication cables in each rack 240, enhancing their ability to be quickly removed, upgraded, reinstalled, and/or replaced. As such, in some embodiments, the data center 100 may operate (e.g., execute workloads, undergo maintenance and/or upgrades, etc.) without human involvement on the data center floor. In other embodiments, a human may facilitate one or more maintenance or upgrade operations in the data center 100.

It should be appreciated that each circuit board guide 330 may be dual sided. That is, each circuit board guide 330 includes an inner wall that defines a circuit board slot 380 on each side of the circuit board guide 330. In this way, each circuit board guide 330 can support a chassis-less circuit board substrate on either side. As such, a single additional elongated support post may be added to the rack 240 to turn the rack 240 into a two-rack solution that can hold twice as many sled slots 320 as shown in FIG. 3. The illustrative rack 240 includes seven pairs 310 of elongated support arms 312 that define a corresponding seven sled slots 320, each configured to receive and support a corresponding sled 400 as discussed above. Of course, in other embodiments, the rack 240 may include additional or fewer pairs 310 of elongated support arms 312 (i.e., additional or fewer sled slots 320). It should be appreciated that because the sled 400 is chassis-less, the sled 400 may have an overall height that is different than typical servers. As such, in some embodiments, the height of each sled slot 320 may be shorter than the height of a typical server (e.g., shorter than a single rank unit, "1 U"). That is, the vertical distance between each pair 310 of elongated support arms 312 may be less than a standard rack unit "1 U." Additionally, due to the relative decrease in height of the sled slots 320, the overall height of the rack 240 in some embodiments may be shorter than the height of traditional rack enclosures. For example, in some embodiments, each of the elongated support posts 302, 304 may have a length of six feet or less. Again, in other embodiments, the rack 240 may have different dimensions. For example, in some embodiments, the vertical distance between each pair 310 of elongated support arms 312 may be greater than a standard rack until "1 U". In such embodiments, the increased vertical distance between the sleds allows for larger heat sinks to be attached to the physical resources and for larger fans to be used (e.g., in the fan array 370 described below) for cooling each sled, which in turn can allow the physical resources to operate at increased power levels. Further, it should be appreciated that the rack 240 does not include any walls, enclosures, or the like. Rather, the rack 240 is an enclosure-less rack that is opened to the local environment. Of course, in some cases, an end plate may be attached to one of the elongated support posts 302, 304 in those situations in which the rack 240 forms an end-of-row rack in the data center 100.

In some embodiments, various interconnects may be routed upwardly or downwardly through the elongated support posts 302, 304. To facilitate such routing, each elongated support post 302, 304 includes an inner wall that defines an inner chamber in which interconnects may be located. The interconnects routed through the elongated support posts 302, 304 may be embodied as any type of interconnects including, but not limited to, data or communication interconnects to provide communication connections to each sled slot 320, power interconnects to provide power to each sled slot 320, and/or other types of interconnects.

The rack 240, in the illustrative embodiment, includes a support platform on which a corresponding optical data connector (not shown) is mounted. Each optical data connector is associated with a corresponding sled slot 320 and is configured to mate with an optical data connector of a corresponding sled 400 when the sled 400 is received in the corresponding sled slot 320. In some embodiments, optical connections between components (e.g., sleds, racks, and switches) in the data center 100 are made with a blind mate optical connection. For example, a door on each cable may prevent dust from contaminating the fiber inside the cable. In the process of connecting to a blind mate optical connector mechanism, the door is pushed open when the end of the cable approaches or enters the connector mechanism. Subsequently, the optical fiber inside the cable may enter a gel within the connector mechanism and the optical fiber of one cable comes into contact with the optical fiber of another cable within the gel inside the connector mechanism.

The illustrative rack 240 also includes a fan array 370 coupled to the cross-support arms of the rack 240. The fan array 370 includes one or more rows of cooling fans 372, which are aligned in a horizontal line between the elongated support posts 302, 304. In the illustrative embodiment, the fan array 370 includes a row of cooling fans 372 for each sled slot 320 of the rack 240. As discussed above, each sled 400 does not include any on-board cooling system in the illustrative embodiment and, as such, the fan array 370 provides cooling for each sled 400 received in the rack 240. Each rack 240, in the illustrative embodiment, also includes a power supply associated with each sled slot 320. Each power supply is secured to one of the elongated support arms 312 of the pair 310 of elongated support arms 312 that define the corresponding sled slot 320. For example, the rack 240 may include a power supply coupled or secured to each elongated support arm 312 extending from the elongated support post 302. Each power supply includes a power connector configured to mate with a power connector of the sled 400 when the sled 400 is received in the corresponding sled slot 320. In the illustrative embodiment, the sled 400 does not include any on-board power supply and, as such, the power supplies provided in the rack 240 supply power to corresponding sleds 400 when mounted to the rack 240. Each power supply is configured to satisfy the power requirements for its associated sled, which can vary from sled to sled. Additionally, the power supplies provided in the rack 240 can operate independent of each other. That is, within a single rack, a first power supply providing power to a compute sled can provide power levels that are different than power levels supplied by a second power supply providing power to an accelerator sled. The power supplies may be controllable at the sled level or rack level, and may be controlled locally by components on the associated sled or remotely, such as by another sled or an orchestrator.

Figure 6:
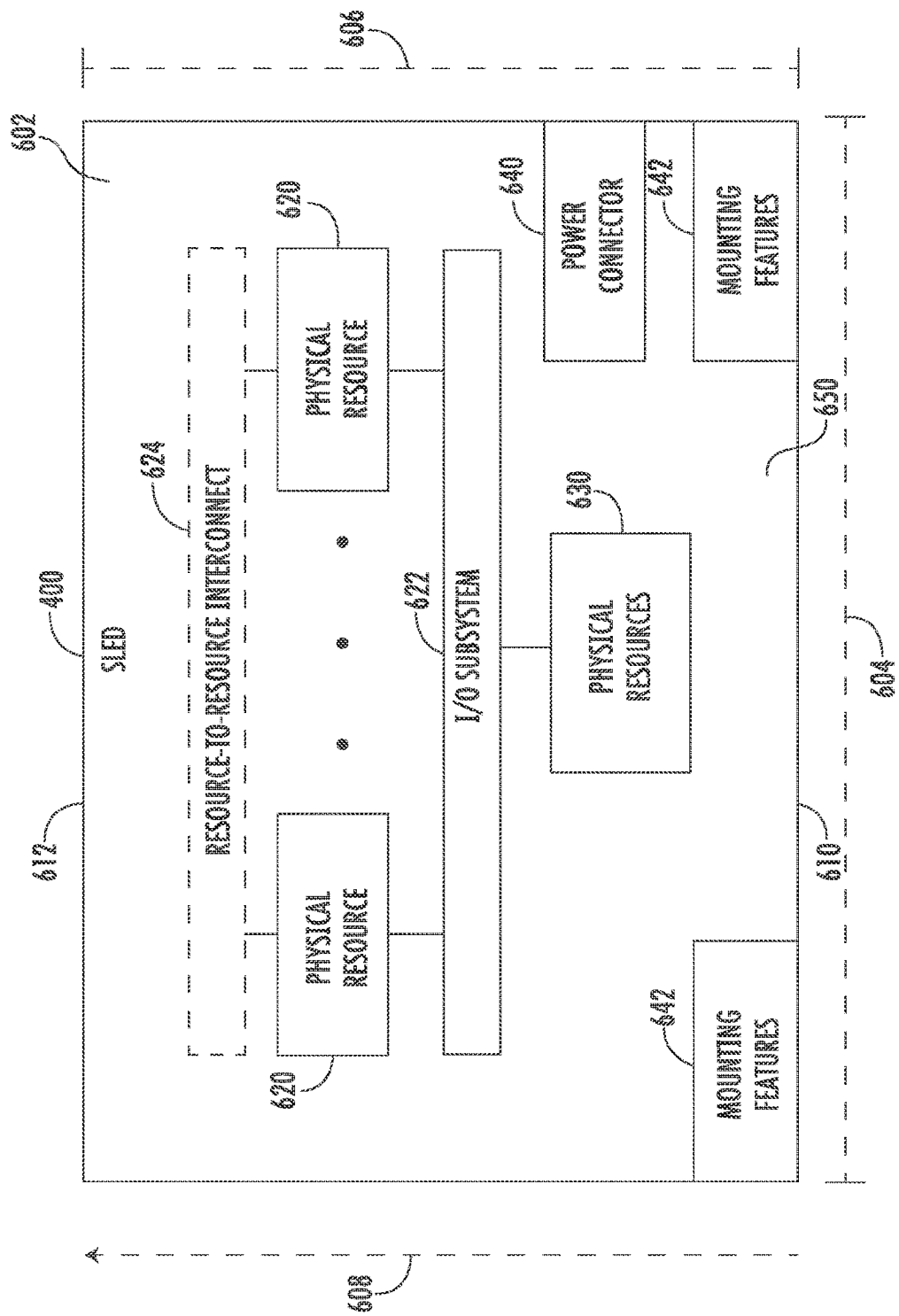
FIG. 6 is a is a simplified block diagram of at least one embodiment of a top side of the sled of FIG. 5, in accordance with an embodiment of the disclosure.

Referring now to FIG. 6, the sled 400, in the illustrative embodiment, is configured to be mounted in a corresponding rack 240 of the data center 100 as discussed above. In some embodiments, each sled 400 may be optimized or otherwise configured for performing particular tasks, such as compute tasks, acceleration tasks, data storage tasks, etc. For example, the sled 400 may be embodied as a compute sled 800 as discussed below in regard to FIGS. 8-9, an accelerator sled 1000 as discussed below in regard to FIGS. 10-11, a storage sled 1200 as discussed below in regard to FIGS. 12-13, or as a sled optimized or otherwise configured to perform other specialized tasks, such as a memory sled 1400, discussed below in regard to FIG. 14.

As discussed above, the illustrative sled 400 includes a chassis-less circuit board substrate 602, which supports various physical resources (e.g., electrical components) mounted thereon. It should be appreciated that the chassis-less circuit board substrate 602 is "chassis-less" in that the sled 400 does not include a housing or enclosure. Rather, the chassis-less circuit board substrate 602 is open to the local environment. The chassis-less circuit board substrate 602 may be formed from any material capable of supporting the various electrical components mounted thereon. For example, in an illustrative embodiment, the chassis-less circuit board substrate 602 is formed from an FR-4 glass-reinforced epoxy laminate material. Of course, other materials may be used to form the chassis-less circuit board substrate 602 in other embodiments.

As discussed in more detail below, the chassis-less circuit board substrate 602 includes multiple features that improve the thermal cooling characteristics of the various electrical components mounted on the chassis-less circuit board substrate 602. As discussed, the chassis-less circuit board substrate 602 does not include a housing or enclosure, which may improve the airflow over the electrical components of the sled 400 by reducing those structures that may inhibit air flow. For example, because the chassis-less circuit board substrate 602 is not positioned in an individual housing or enclosure, there is no vertically-arranged backplane (e.g., a back plate of the chassis) attached to the chassis-less circuit board substrate 602, which could inhibit air flow across the electrical components. Additionally, the chassis-less circuit board substrate 602 has a geometric shape configured to reduce the length of the airflow path across the electrical components mounted to the chassis-less circuit board substrate 602. For example, the illustrative chassis-less circuit board substrate 602 has a width 604 that is greater than a depth 606 of the chassis-less circuit board substrate 602. In one particular embodiment, for example, the chassis-less circuit board substrate 602 has a width of about 21 inches and a depth of about 9 inches, compared to a typical server that has a width of 17 inches and a depth of about 39 inches. As such, an airflow path 608 that extends from a front edge 610 of the chassis-less circuit board substrate 602 toward a rear edge 612 has a shorter distance relative to typical servers, which may improve the thermal cooling characteristics of the sled 400. Furthermore, although not illustrated in FIG. 6, the various physical resources mounted to the chassis-less circuit board substrate 602 are mounted in corresponding locations such that no two substantively heat-producing electrical components shadow each other as discussed in more detail below. That is, no two electrical components, which produce appreciable heat during operation (i.e., greater than a nominal heat sufficient enough to adversely impact the cooling of another electrical component), are mounted to the chassis-less circuit board substrate 602 linearly in-line with each other along the direction of the airflow path 608 (i.e., along a direction extending from the front edge 610 toward the rear edge 612 of the chassis-less circuit board substrate 602).

As discussed above, the illustrative sled 400 includes one or more physical resources 620 mounted to a top side 650 of the chassis-less circuit board substrate 602. Although two physical resources 620 are shown in FIG. 6, it should be appreciated that the sled 400 may include one, two, or more physical resources 620 in other embodiments. The physical resources 620 may be embodied as any type of processor, controller, or other compute circuit capable of performing various tasks such as compute functions and/or controlling the functions of the sled 400 depending on, for example, the type or intended functionality of the sled 400. For example, as discussed in more detail below, the physical resources 620 may be embodied as high-performance processors in embodiments in which the sled 400 is embodied as a compute sled, as accelerator co-processors or circuits in embodiments in which the sled 400 is embodied as an accelerator sled, storage controllers in embodiments in which the sled 400 is embodied as a storage sled, or a set of memory devices in embodiments in which the sled 400 is embodied as a memory sled.

The sled 400 also includes one or more additional physical resources 630 mounted to the top side 650 of the chassis-less circuit board substrate 602. In the illustrative embodiment, the additional physical resources include a network interface controller (NIC) as discussed in more detail below. Of course, depending on the type and functionality of the sled 400, the physical resources 630 may include additional or other electrical components, circuits, and/or devices in other embodiments.

The physical resources 620 are communicatively coupled to the physical resources 630 via an input/output (I/O) subsystem 622. The I/O subsystem 622 may be embodied as circuitry and/or components to facilitate input/output operations with the physical resources 620, the physical resources 630, and/or other components of the sled 400. For example, the I/O subsystem 622 may be embodied as, or otherwise include, memory controller hubs, input/output control hubs, integrated sensor hubs, firmware devices, communication links (e.g., point-to-point links, bus links, wires, cables, waveguides, light guides, printed circuit board traces, etc.), and/or other components and subsystems to facilitate the input/output operations. In the illustrative embodiment, the I/O subsystem 622 is embodied as, or otherwise includes, a double data rate 4 (DDR4) data bus or a DDR5 data bus In some embodiments, the sled 400 may also include a resource-to-resource interconnect 624. The resource-to-resource interconnect 624 may be embodied as any type of communication interconnect capable of facilitating resource-to-resource communications. In the illustrative embodiment, the resource-to-resource interconnect 624 is embodied as a high-speed point-to-point interconnect (e.g., faster than the I/O subsystem 622). For example, the resource-to-resource interconnect 624 may be embodied as a QuickPath Interconnect (QPI), an UltraPath Interconnect (UPI), or other high-speed point-to-point interconnect dedicated to resource-to-resource communications.

The sled 400 also includes a power connector 640 configured to mate with a corresponding power connector of the rack 240 when the sled 400 is mounted in the corresponding rack 240. The sled 400 receives power from a power supply of the rack 240 via the power connector 640 to supply power to the various electrical components of the sled 400. That is, the sled 400 does not include any local power supply (i.e., an on-board power supply) to provide power to the electrical components of the sled 400. The exclusion of a local or on-board power supply facilitates the reduction in the overall footprint of the chassis-less circuit board substrate 602, which may increase the thermal cooling characteristics of the various electrical components mounted on the chassis-less circuit board substrate 602 as discussed above. In some embodiments, voltage regulators are placed on a bottom side 750 (see FIG. 7) of the chassis-less circuit board substrate 602 directly opposite of the processors 820 (see FIG. 8), and power is routed from the voltage regulators to the processors 820 by vias extending through the chassis-less circuit board substrate 602. Such a configuration provides an increased thermal budget, additional current and/or voltage, and better voltage control relative to typical printed circuit boards in which processor power is delivered from a voltage regulator, in part, by printed circuit traces.

In some embodiments, the sled 400 may also include mounting features 642 configured to mate with a mounting arm, or other structure, of a robot to facilitate the placement of the sled 600 in a rack 240 by the robot. The mounting features 642 may be embodied as any type of physical structures that allow the robot to grasp the sled 400 without damaging the chassis-less circuit board substrate 602 or the electrical components mounted thereto. For example, in some embodiments, the mounting features 642 may be embodied as non-conductive pads attached to the chassis-less circuit board substrate 602. In other embodiments, the mounting features may be embodied as brackets, braces, or other similar structures attached to the chassis-less circuit board substrate 602. The particular number, shape, size, and/or make-up of the mounting feature 642 may depend on the design of the robot configured to manage the sled 400.

Figure 7:
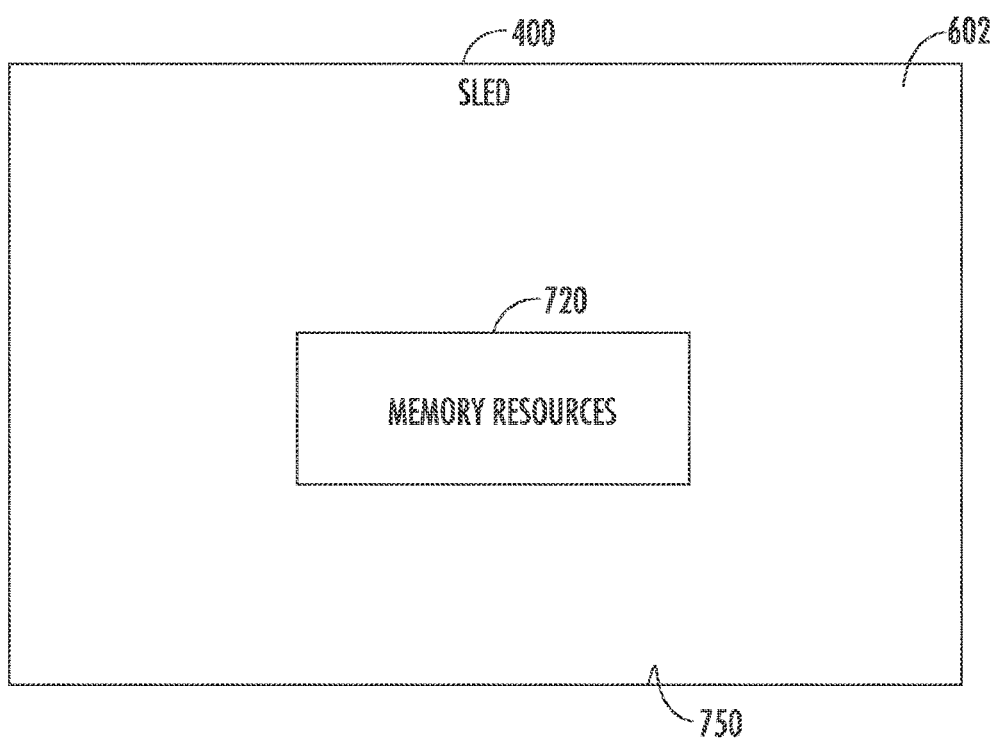
FIG. 7 is a simplified block diagram of at least one embodiment of a bottom side of the sled of FIG. 6, in accordance with an embodiment of the disclosure.

Referring now to FIG. 7, in addition to the physical resources 630 mounted on the top side 650 of the chassis-less circuit board substrate 602, the sled 400 also includes one or more memory devices 720 mounted to a bottom side 750 of the chassis-less circuit board substrate 602. That is, the chassis-less circuit board substrate 602 is embodied as a double-sided circuit board. The physical resources 620 are communicatively coupled to the memory devices 720 via the I/O subsystem 622. For example, the physical resources 620 and the memory devices 720 may be communicatively coupled by one or more vias extending through the chassis-less circuit board substrate 602. Each physical resource 620 may be communicatively coupled to a different set of one or more memory devices 720 in some embodiments. Alternatively, in other embodiments, each physical resource 620 may be communicatively coupled to each memory device 720.

The memory devices 720 may be embodied as any type of memory device capable of storing data for the physical resources 620 during operation of the sled 400, such as any type of volatile (e.g., dynamic random access memory (DRAM), etc.) or non-volatile memory. Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A memory device may also include next-generation nonvolatile devices, such as Intel 3D XPoint™ memory or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. In some embodiments, the memory device may include a transistor-less stackable cross point architecture in which memory cells sit at the intersection of word lines and bit lines and are individually addressable and in which bit storage is based on a change in bulk resistance.

Figure 8:
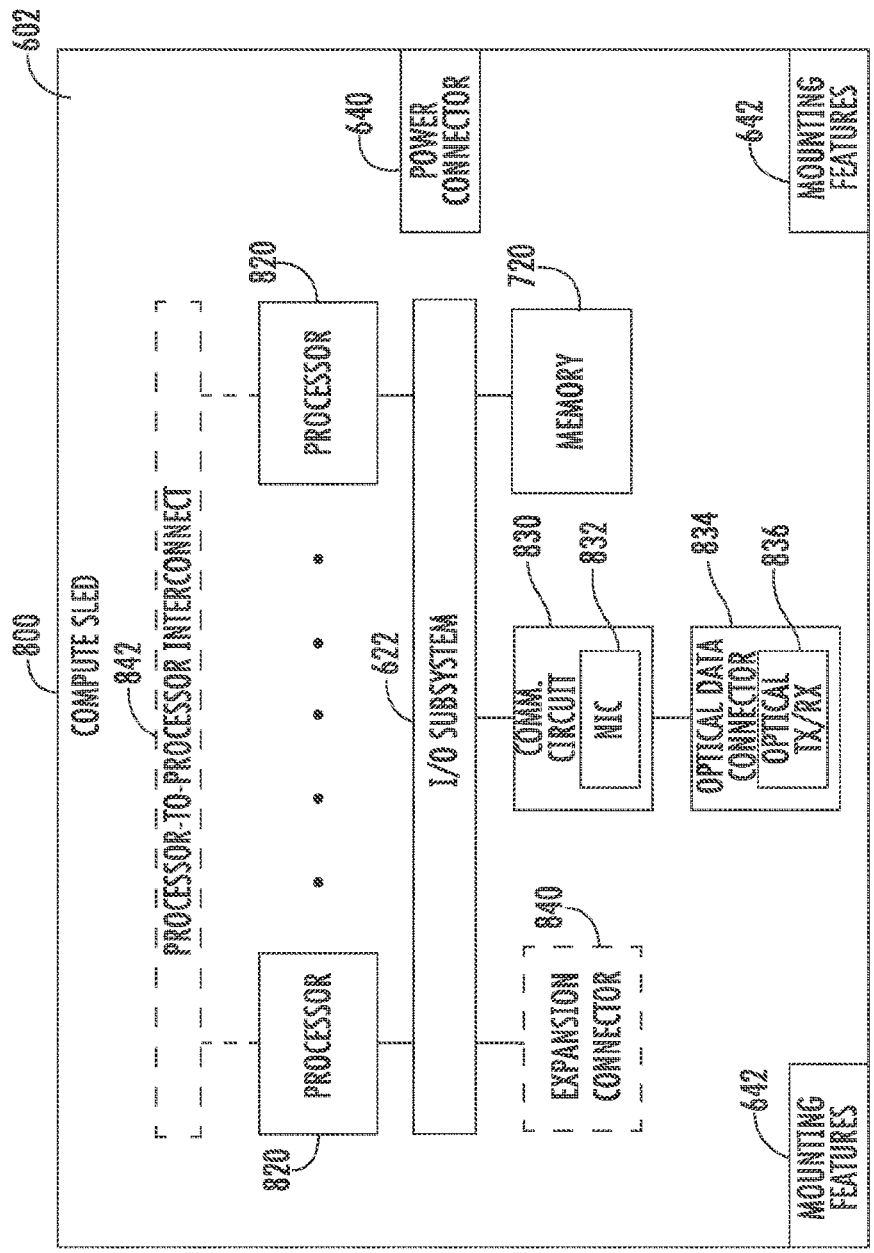
FIG. 8 is a simplified block diagram of at least one embodiment of a compute sled usable in the data center of FIG. 1, in accordance with an embodiment of the disclosure.

Referring now to FIG. 8, in some embodiments, the sled 400 may be embodied as a compute sled 800. The compute sled 800 is optimized, or otherwise configured, to perform compute tasks. Of course, as discussed above, the compute sled 800 may rely on other sleds, such as acceleration sleds and/or storage sleds, to perform such compute tasks. The compute sled 800 includes various physical resources (e.g., electrical components) similar to the physical resources of the sled 400, which have been identified in FIG. 8 using the same reference numbers. The description of such components provided above in regard to FIGS. 6 and 7 applies to the corresponding components of the compute sled 800 and is not repeated herein for clarity of the description of the compute sled 800.

In the illustrative compute sled 800, the physical resources 620 are embodied as processors 820. Although only two processors 820 are shown in FIG. 8, it should be appreciated that the compute sled 800 may include additional processors 820 in other embodiments. Illustratively, the processors 820 are embodied as high-performance processors 820 and may be configured to operate at a relatively high power rating. Although the processors 820 generate additional heat operating at power ratings greater than typical processors (which operate at around 155-230 W), the enhanced thermal cooling characteristics of the chassis-less circuit board substrate 602 discussed above facilitate the higher power operation. For example, in the illustrative embodiment, the processors 820 are configured to operate at a power rating of at least 250 W. In some embodiments, the processors 820 may be configured to operate at a power rating of at least 350 W.

In some embodiments, the compute sled 800 may also include a processor-to-processor interconnect 842. Similar to the resource-to-resource interconnect 624 of the sled 400 discussed above, the processor-to-processor interconnect 842 may be embodied as any type of communication interconnect capable of facilitating processor-to-processor interconnect 842 communications. In the illustrative embodiment, the processor-to-processor interconnect 842 is embodied as a high-speed point-to-point interconnect (e.g., faster than the I/O subsystem 622). For example, the processor-to-processor interconnect 842 may be embodied as a QuickPath Interconnect (QPI), an UltraPath Interconnect (UPI), or other high-speed point-to-point interconnect dedicated to processor-to-processor communications.

The compute sled 800 also includes a communication circuit 830. The illustrative communication circuit 830 includes a network interface controller (NIC) 832, which may also be referred to as a host fabric interface (HFI). The NIC 832 may be embodied as, or otherwise include, any type of integrated circuit, discrete circuits, controller chips, chipsets, add-in-boards, daughter cards, network interface cards, or other devices that may be used by the compute sled 800 to connect with another compute device (e.g., with other sleds 400). In some embodiments, the NIC 832 may be embodied as part of a system-on-a-chip (SoC) that includes one or more processors, or included on a multichip package that also contains one or more processors. In some embodiments, the NIC 832 may include a local processor (not shown) and/or a local memory (not shown) that are both local to the NIC 832. In such embodiments, the local processor of the NIC 832 may be capable of performing one or more of the functions of the processors 820. Additionally or alternatively, in such embodiments, the local memory of the NIC 832 may be integrated into one or more components of the compute sled at the board level, socket level, chip level, and/or other levels.

The communication circuit 830 is communicatively coupled to an optical data connector 834. The optical data connector 834 is configured to mate with a corresponding optical data connector of the rack 240 when the compute sled 800 is mounted in the rack 240. Illustratively, the optical data connector 834 includes a plurality of optical fibers which lead from a mating surface of the optical data connector 834 to an optical transceiver 836. The optical transceiver 836 is configured to convert incoming optical signals from the rack-side optical data connector to electrical signals and to convert electrical signals to outgoing optical signals to the rack-side optical data connector. Although shown as forming part of the optical data connector 834 in the illustrative embodiment, the optical transceiver 836 may form a portion of the communication circuit 830 in other embodiments.

In some embodiments, the compute sled 800 may also include an expansion connector 840. In such embodiments, the expansion connector 840 is configured to mate with a corresponding connector of an expansion chassis-less circuit board substrate to provide additional physical resources to the compute sled 800. The additional physical resources may be used, for example, by the processors 820 during operation of the compute sled 800. The expansion chassis-less circuit board substrate may be substantially similar to the chassis-less circuit board substrate 602 discussed above and may include various electrical components mounted thereto. The particular electrical components mounted to the expansion chassis-less circuit board substrate may depend on the intended functionality of the expansion chassis-less circuit board substrate. For example, the expansion chassis-less circuit board substrate may provide additional compute resources, memory resources, and/or storage resources. As such, the additional physical resources of the expansion chassis-less circuit board substrate may include, but is not limited to, processors, memory devices, storage devices, and/or accelerator circuits including, for example, field programmable gate arrays (FPGA), application-specific integrated circuits (ASICs), security co-processors, graphics processing units (GPUs), machine learning circuits, or other specialized processors, controllers, devices, and/or circuits.

Figure 9:
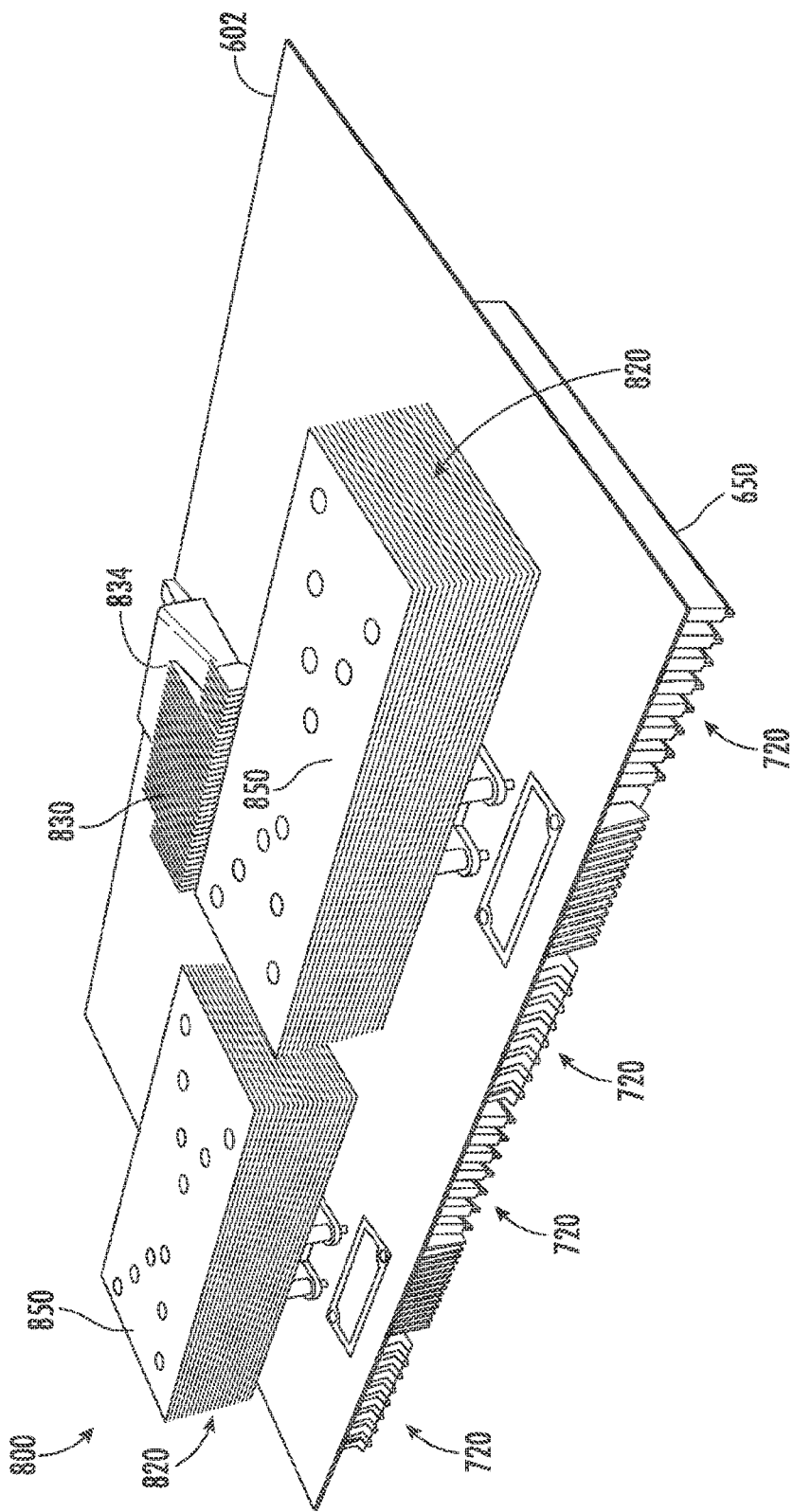
FIG. 9 is a top perspective view of at least one embodiment of the compute sled of FIG. 8, in accordance with an embodiment of the disclosure.

Referring now to FIG. 9, an illustrative embodiment of the compute sled 800 is shown. As shown, the processors 820, communication circuit 830, and optical data connector 834 are mounted to the top side 650 of the chassis-less circuit board substrate 602. Any suitable attachment or mounting technology may be used to mount the physical resources of the compute sled 800 to the chassis-less circuit board substrate 602. For example, the various physical resources may be mounted in corresponding sockets (e.g., a processor socket), holders, or brackets. In some cases, some of the electrical components may be directly mounted to the chassis-less circuit board substrate 602 via soldering or similar techniques.

As discussed above, the individual processors 820 and communication circuit 830 are mounted to the top side 650 of the chassis-less circuit board substrate 602 such that no two heat-producing, electrical components shadow each other. In the illustrative embodiment, the processors 820 and communication circuit 830 are mounted in corresponding locations on the top side 650 of the chassis-less circuit board substrate 602 such that no two of those physical resources are linearly in-line with others along the direction of the airflow path 608. It should be appreciated that, although the optical data connector 834 is in-line with the communication circuit 830, the optical data connector 834 produces no or nominal heat during operation.

The memory devices 720 of the compute sled 800 are mounted to the bottom side 750 of the of the chassis-less circuit board substrate 602 as discussed above in regard to the sled 400. Although mounted to the bottom side 750, the memory devices 720 are communicatively coupled to the processors 820 located on the top side 650 via the I/O subsystem 622. Because the chassis-less circuit board substrate 602 is embodied as a double-sided circuit board, the memory devices 720 and the processors 820 may be communicatively coupled by one or more vias, connectors, or other mechanisms extending through the chassis-less circuit board substrate 602. Of course, each processor 820 may be communicatively coupled to a different set of one or more memory devices 720 in some embodiments. Alternatively, in other embodiments, each processor 820 may be communicatively coupled to each memory device 720. In some embodiments, the memory devices 720 may be mounted to one or more memory mezzanines on the bottom side of the chassis-less circuit board substrate 602 and may interconnect with a corresponding processor 820 through a ball-grid array.

Each of the processors 820 includes a heatsink 850 secured thereto. Due to the mounting of the memory devices 720 to the bottom side 750 of the chassis-less circuit board substrate 602 (as well as the vertical spacing of the sleds 400 in the corresponding rack 240), the top side 650 of the chassis-less circuit board substrate 602 includes additional "free" area or space that facilitates the use of heatsinks 850 having a larger size relative to traditional heatsinks used in typical servers. Additionally, due to the improved thermal cooling characteristics of the chassis-less circuit board substrate 602, none of the processor heatsinks 850 include cooling fans attached thereto. That is, each of the heatsinks 850 is embodied as a fan-less heatsink. In some embodiments, the heatsinks 850 mounted atop the processors 820 may overlap with the heat sink attached to the communication circuit 830 in the direction of the airflow path 608 due to their increased size, as illustratively suggested by FIG. 9.

Figure 10:
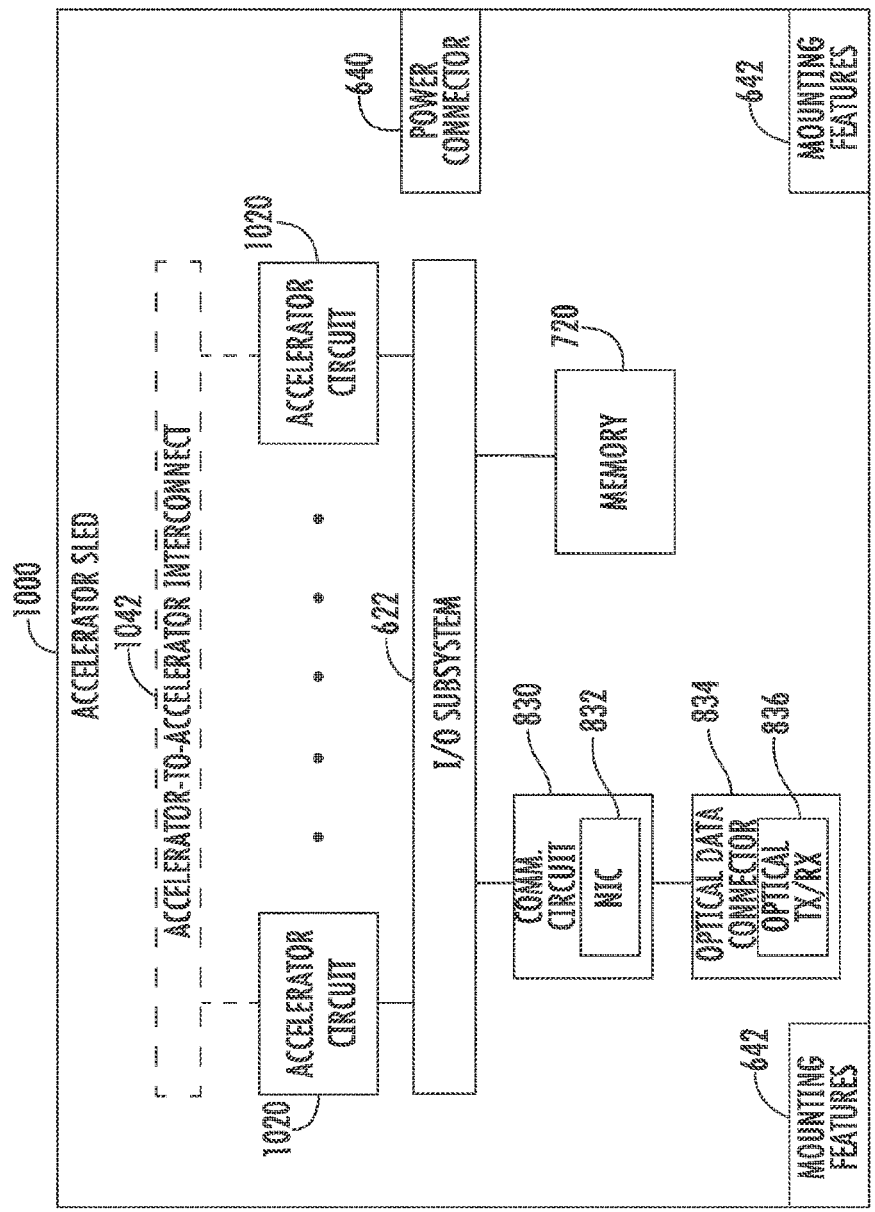
FIG. 10 is a simplified block diagram of at least one embodiment of an accelerator sled usable in the data center of FIG. 1, in accordance with an embodiment of the disclosure.

Referring now to FIG. 10, in some embodiments, the sled 400 may be embodied as an accelerator sled 1000. The accelerator sled 1000 is configured, to perform specialized compute tasks, such as machine learning, encryption, hashing, or other computational-intensive task. In some embodiments, for example, a compute sled 800 may offload tasks to the accelerator sled 1000 during operation. The accelerator sled 1000 includes various components similar to components of the sled 400 and/or compute sled 800, which have been identified in FIG. 10 using the same reference numbers. The description of such components provided above in regard to FIGS. 6, 7, and 8 apply to the corresponding components of the accelerator sled 1000 and is not repeated herein for clarity of the description of the accelerator sled 1000.

Figure 11:
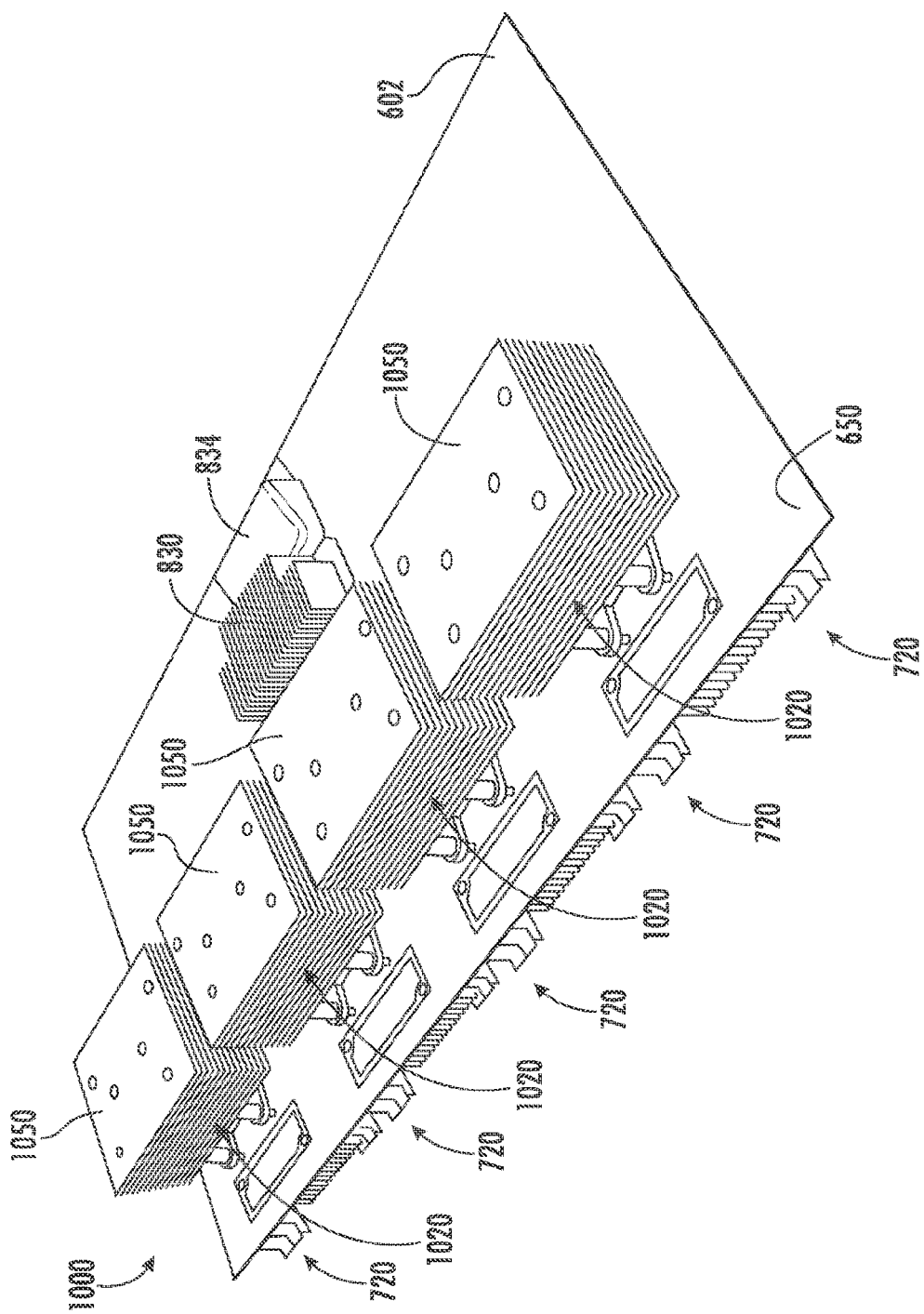
FIG. 11 is a top perspective view of at least one embodiment of the accelerator sled of FIG. 10, in accordance with an embodiment of the disclosure.

In the illustrative accelerator sled 1000, the physical resources 620 are embodied as accelerator circuits 1020. Although only two accelerator circuits 1020 are shown in FIG. 10, it should be appreciated that the accelerator sled 1000 may include additional accelerator circuits 1020 in other embodiments. For example, as shown in FIG. 11, the accelerator sled 1000 may include four accelerator circuits 1020 in some embodiments. The accelerator circuits 1020 may be embodied as any type of processor, co-processor, compute circuit, or other device capable of performing compute or processing operations. For example, the accelerator circuits 1020 may be embodied as, for example, field programmable gate arrays (FPGA), application-specific integrated circuits (ASICs), security co-processors, graphics processing units (GPUs), neuromorphic processor units, quantum computers, machine learning circuits, or other specialized processors, controllers, devices, and/or circuits.

In some embodiments, the accelerator sled 1000 may also include an accelerator-to-accelerator interconnect 1042. Similar to the resource-to-resource interconnect 624 of the sled 600 discussed above, the accelerator-to-accelerator interconnect 1042 may be embodied as any type of communication interconnect capable of facilitating accelerator-to-accelerator communications. In the illustrative embodiment, the accelerator-to-accelerator interconnect 1042 is embodied as a high-speed point-to-point interconnect (e.g., faster than the I/O subsystem 622). For example, the accelerator-to-accelerator interconnect 1042 may be embodied as a QuickPath Interconnect (QPI), an UltraPath Interconnect (UPI), or other high-speed point-to-point interconnect dedicated to processor-to-processor communications. In some embodiments, the accelerator circuits 1020 may be daisy-chained with a primary accelerator circuit 1020 connected to the NIC 832 and memory devices 720 through the I/O subsystem 622 and a secondary accelerator circuit 1020 connected to the NIC 832 and memory devices 720 through a primary accelerator circuit 1020.

Referring now to FIG. 11, an illustrative embodiment of the accelerator sled 1000 is shown. As discussed above, the accelerator circuits 1020, communication circuit 830, and optical data connector 834 are mounted to the top side 650 of the chassis-less circuit board substrate 602. Again, the individual accelerator circuits 1020 and communication circuit 830 are mounted to the top side 650 of the chassis-less circuit board substrate 602 such that no two heat-producing, electrical components shadow each other as discussed above. The memory devices 720 of the accelerator sled 1000 are mounted to the bottom side 750 of the of the chassis-less circuit board substrate 602 as discussed above in regard to the sled 600. Although mounted to the bottom side 750, the memory devices 720 are communicatively coupled to the accelerator circuits 1020 located on the top side 650 via the I/O subsystem 622 (e.g., through vias). Further, each of the accelerator circuits 1020 may include a heatsink 1070 that is larger than a traditional heatsink used in a server. As discussed above with reference to the heatsinks 870, the heatsinks 1070 may be larger than traditional heatsinks because of the "free" area provided by the memory devices 720 being located on the bottom side 750 of the chassis-less circuit board substrate 602 rather than on the top side 650.

Figure 12:
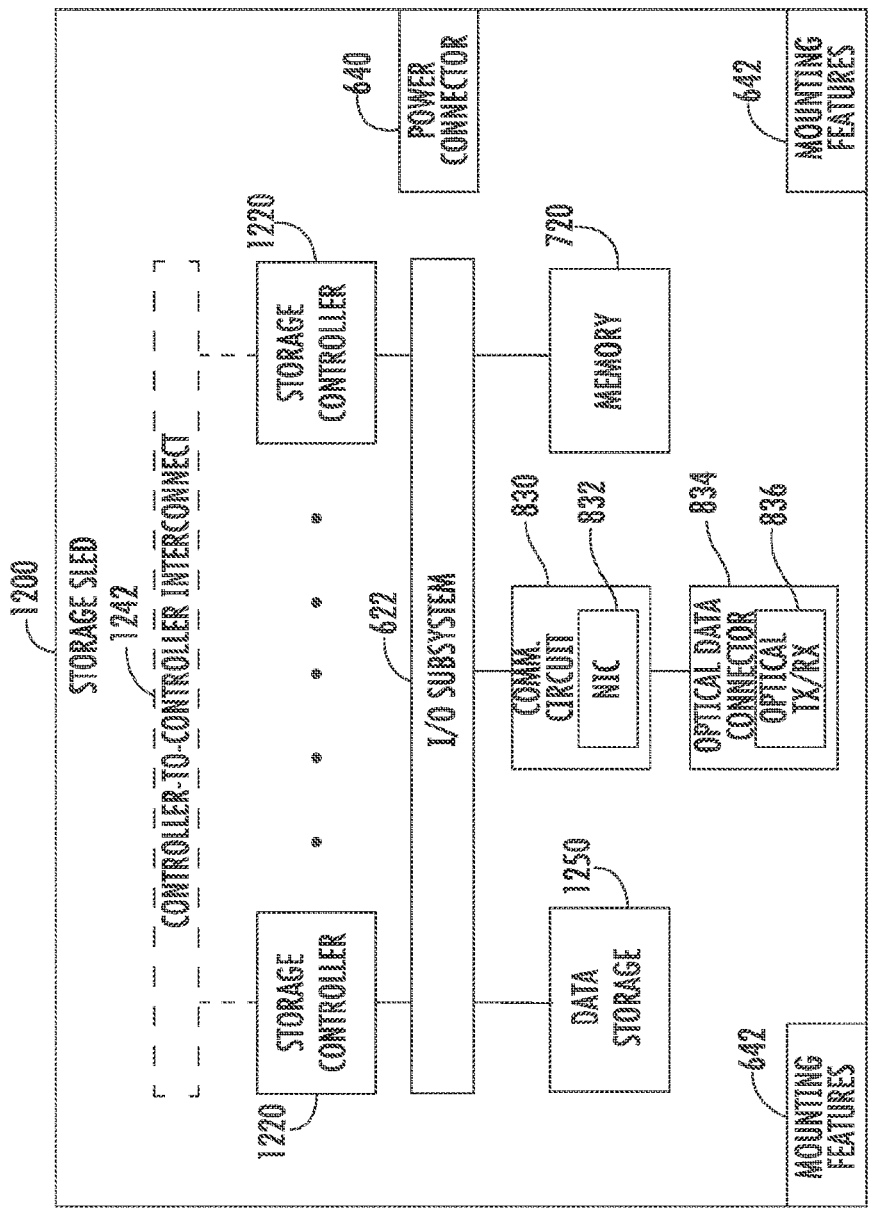
FIG. 12 is a simplified block diagram of at least one embodiment of a storage sled usable in the data center of FIG. 1, in accordance with an embodiment of the disclosure.

Referring now to FIG. 12, in some embodiments, the sled 400 may be embodied as a storage sled 1200. The storage sled 1200 is configured, to store data in a data storage 1250 local to the storage sled 1200. For example, during operation, a compute sled 800 or an accelerator sled 1000 may store and retrieve data from the data storage 1250 of the storage sled 1200. The storage sled 1200 includes various components similar to components of the sled 400 and/or the compute sled 800, which have been identified in FIG. 12 using the same reference numbers. The description of such components provided above in regard to FIGS. 6, 7, and 8 apply to the corresponding components of the storage sled 1200 and is not repeated herein for clarity of the description of the storage sled 1200.

In the illustrative storage sled 1200, the physical resources 620 are embodied as storage controllers 1220. Although only two storage controllers 1220 are shown in FIG. 12, it should be appreciated that the storage sled 1200 may include additional storage controllers 1220 in other embodiments. The storage controllers 1220 may be embodied as any type of processor, controller, or control circuit capable of controlling the storage and retrieval of data into the data storage 1250 based on requests received via the communication circuit 830. In the illustrative embodiment, the storage controllers 1220 are embodied as relatively low-power processors or controllers. For example, in some embodiments, the storage controllers 1220 may be configured to operate at a power rating of about 75 watts.

In some embodiments, the storage sled 1200 may also include a controller-to-controller interconnect 1242. Similar to the resource-to-resource interconnect 624 of the sled 400 discussed above, the controller-to-controller interconnect 1242 may be embodied as any type of communication interconnect capable of facilitating controller-to-controller communications. In the illustrative embodiment, the controller-to-controller interconnect 1242 is embodied as a high-speed point-to-point interconnect (e.g., faster than the I/O subsystem 622). For example, the controller-to-controller interconnect 1242 may be embodied as a QuickPath Interconnect (QPI), an UltraPath Interconnect (UPI), or other high-speed point-to-point interconnect dedicated to processor-to-processor communications.

Figure 13:
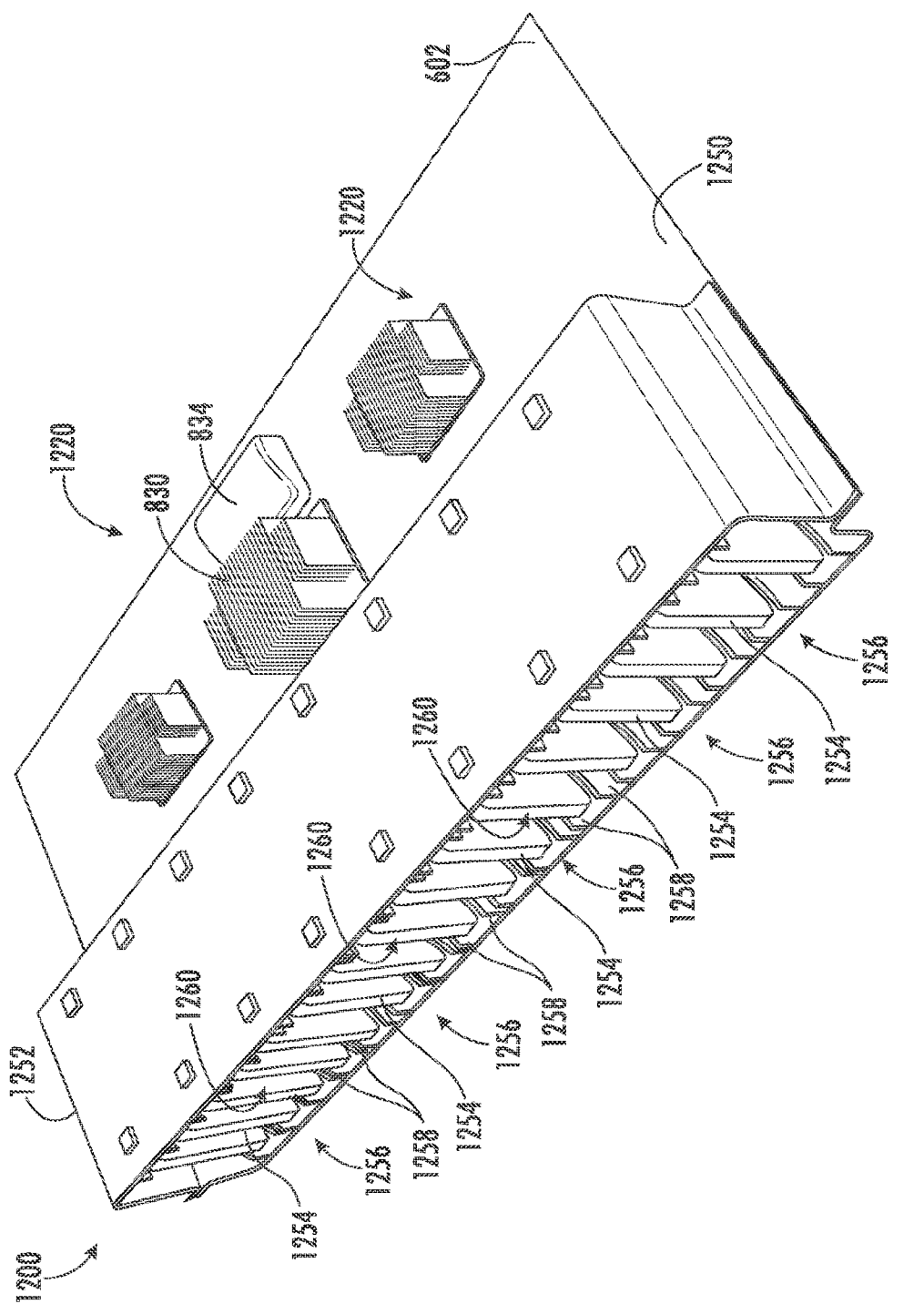
FIG. 13 is a top perspective view of at least one embodiment of the storage sled of FIG. 12, in accordance with an embodiment of the disclosure.

Referring now to FIG. 13, an illustrative embodiment of the storage sled 1200 is shown. In the illustrative embodiment, the data storage 1250 is embodied as, or otherwise includes, a storage cage 1252 configured to house one or more solid state drives (SSDs) 1254. To do so, the storage cage 1252 includes a number of mounting slots 1256, each of which is configured to receive a corresponding solid state drive 1254. Each of the mounting slots 1256 includes a number of drive guides 1258 that cooperate to define an access opening 1260 of the corresponding mounting slot 1256. The storage cage 1252 is secured to the chassis-less circuit board substrate 602 such that the access openings face away from (i.e., toward the front of) the chassis-less circuit board substrate 602. As such, solid state drives 1254 are accessible while the storage sled 1200 is mounted in a corresponding rack 204. For example, a solid state drive 1254 may be swapped out of a rack 240 (e.g., via a robot) while the storage sled 1200 remains mounted in the corresponding rack 240.

The storage cage 1252 illustratively includes sixteen mounting slots 1256 and is capable of mounting and storing sixteen solid state drives 1254. Of course, the storage cage 1252 may be configured to store additional or fewer solid state drives 1254 in other embodiments. Additionally, in the illustrative embodiment, the solid state drivers are mounted vertically in the storage cage 1252, but may be mounted in the storage cage 1252 in a different orientation in other embodiments. Each solid state drive 1254 may be embodied as any type of data storage device capable of storing long term data. To do so, the solid state drives 1254 may include volatile and non-volatile memory devices discussed above.

As shown in FIG. 13, the storage controllers 1220, the communication circuit 830, and the optical data connector 834 are illustratively mounted to the top side 650 of the chassis-less circuit board substrate 602. Again, as discussed above, any suitable attachment or mounting technology may be used to mount the electrical components of the storage sled 1200 to the chassis-less circuit board substrate 602 including, for example, sockets (e.g., a processor socket), holders, brackets, soldered connections, and/or other mounting or securing techniques.

As discussed above, the individual storage controllers 1220 and the communication circuit 830 are mounted to the top side 650 of the chassis-less circuit board substrate 602 such that no two heat-producing, electrical components shadow each other. For example, the storage controllers 1220 and the communication circuit 830 are mounted in corresponding locations on the top side 650 of the chassis-less circuit board substrate 602 such that no two of those electrical components are linearly in-line with each other along the direction of the airflow path 608.

The memory devices 720 of the storage sled 1200 are mounted to the bottom side 750 of the of the chassis-less circuit board substrate 602 as discussed above in regard to the sled 400. Although mounted to the bottom side 750, the memory devices 720 are communicatively coupled to the storage controllers 1220 located on the top side 650 via the I/O subsystem 622. Again, because the chassis-less circuit board substrate 602 is embodied as a double-sided circuit board, the memory devices 720 and the storage controllers 1220 may be communicatively coupled by one or more vias, connectors, or other mechanisms extending through the chassis-less circuit board substrate 602. Each of the storage controllers 1220 includes a heatsink 1270 secured thereto. As discussed above, due to the improved thermal cooling characteristics of the chassis-less circuit board substrate 602 of the storage sled 1200, none of the heatsinks 1270 include cooling fans attached thereto. That is, each of the heatsinks 1270 is embodied as a fan-less heatsink.

Figure 14:
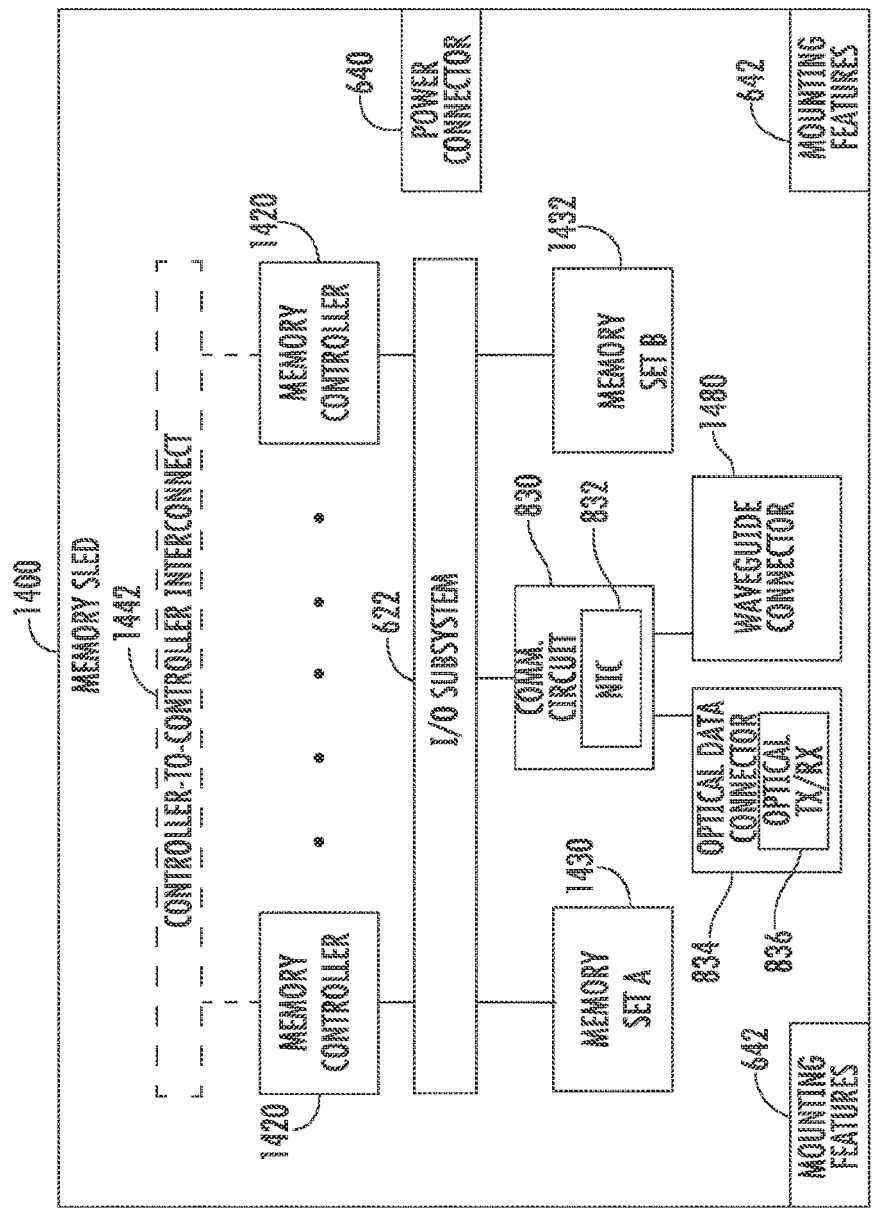
FIG. 14 is a simplified block diagram of at least one embodiment of a memory sled usable in the data center of FIG. 1, in accordance with an embodiment of the disclosure.

Referring now to FIG. 14, in some embodiments, the sled 400 may be embodied as a memory sled 1400. The memory sled 1400 is optimized, or otherwise configured, to provide other sleds 400 (e.g., compute sleds 800, accelerator sleds 1000, etc.) with access to a pool of memory (e.g., in two or more memory sets 1430, 1432 of memory devices 720) local to the storage sled 1200. For example, during operation, a compute sled 800 or an accelerator sled 1000 may remotely write to and/or read from one or more of the memory sets 1430, 1432 of the storage sled 1200 using a logical address space that maps to physical addresses in the memory sets 1430, 1432. The memory sled 1400 includes various components similar to components of the sled 400 and/or the compute sled 800, which have been identified in FIG. 14 using the same reference numbers. The description of such components provided above in regard to FIGS. 6, 7, and 8 apply to the corresponding components of the memory sled 1400 and is not repeated herein for clarity of the description of the memory sled 1400.

In the illustrative memory sled 1400, the physical resources 620 are embodied as memory controllers 1420. Although only two memory controllers 1420 are shown in FIG. 14, it should be appreciated that the memory sled 1400 may include additional memory controllers 1420 in other embodiments. The memory controllers 1420 may be embodied as any type of processor, controller, or control circuit capable of controlling the writing and reading of data into the memory sets 1430, 1432 based on requests received via the communication circuit 830. In the illustrative embodiment, each memory controller 1420 is connected to a corresponding memory set 1430, 1432 to write to and read from memory devices 720 within the corresponding memory set 1430, 1432 and enforce any permissions (e.g., read, write, etc.) associated with sled 400 that has sent a request to the memory sled 1400 to perform a memory access operation (e.g., read or write).

In some embodiments, the memory sled 1400 may also include a controller-to-controller interconnect 1442. Similar to the resource-to-resource interconnect 624 of the sled 400 discussed above, the controller-to-controller interconnect 1442 may be embodied as any type of communication interconnect capable of facilitating controller-to-controller communications. In the illustrative embodiment, the controller-to-controller interconnect 1442 is embodied as a high-speed point-to-point interconnect (e.g., faster than the I/O subsystem 622). For example, the controller-to-controller interconnect 1442 may be embodied as a QuickPath Interconnect (QPI), an UltraPath Interconnect (UPI), or other high-speed point-to-point interconnect dedicated to processor-to-processor communications. As such, in some embodiments, a memory controller 1420 may access, through the controller-to-controller interconnect 1442, memory that is within the memory set 1432 associated with another memory controller 1420. In some embodiments, a scalable memory controller is made of multiple smaller memory controllers, referred to herein as "chiplets", on a memory sled (e.g., the memory sled 1400). The chiplets may be interconnected (e.g., using EMIB (Embedded Multi-Die Interconnect Bridge)). The combined chiplet memory controller may scale up to a relatively large number of memory controllers and I/O ports, (e.g., up to 16 memory channels). In some embodiments, the memory controllers 1420 may implement a memory interleave (e.g., one memory address is mapped to the memory set 1430, the next memory address is mapped to the memory set 1432, and the third address is mapped to the memory set 1430, etc.). The interleaving may be managed within the memory controllers 1420, or from CPU sockets (e.g., of the compute sled 800) across network links to the memory sets 1430, 1432, and may improve the latency associated with performing memory access operations as compared to accessing contiguous memory addresses from the same memory device.

Further, in some embodiments, the memory sled 1400 may be connected to one or more other sleds 400 (e.g., in the same rack 240 or an adjacent rack 240) through a waveguide, using the waveguide connector 1480. In the illustrative embodiment, the waveguides are 64 millimeter waveguides that provide 16 Rx (i.e., receive) lanes and 16 Tx (i.e., transmit) lanes. Each lane, in the illustrative embodiment, is either 16 GHz or 32 GHz. In other embodiments, the frequencies may be different. Using a waveguide may provide high throughput access to the memory pool (e.g., the memory sets 1430, 1432) to another sled (e.g., a sled 400 in the same rack 240 or an adjacent rack 240 as the memory sled 1400) without adding to the load on the optical data connector 834.

Figure 15:
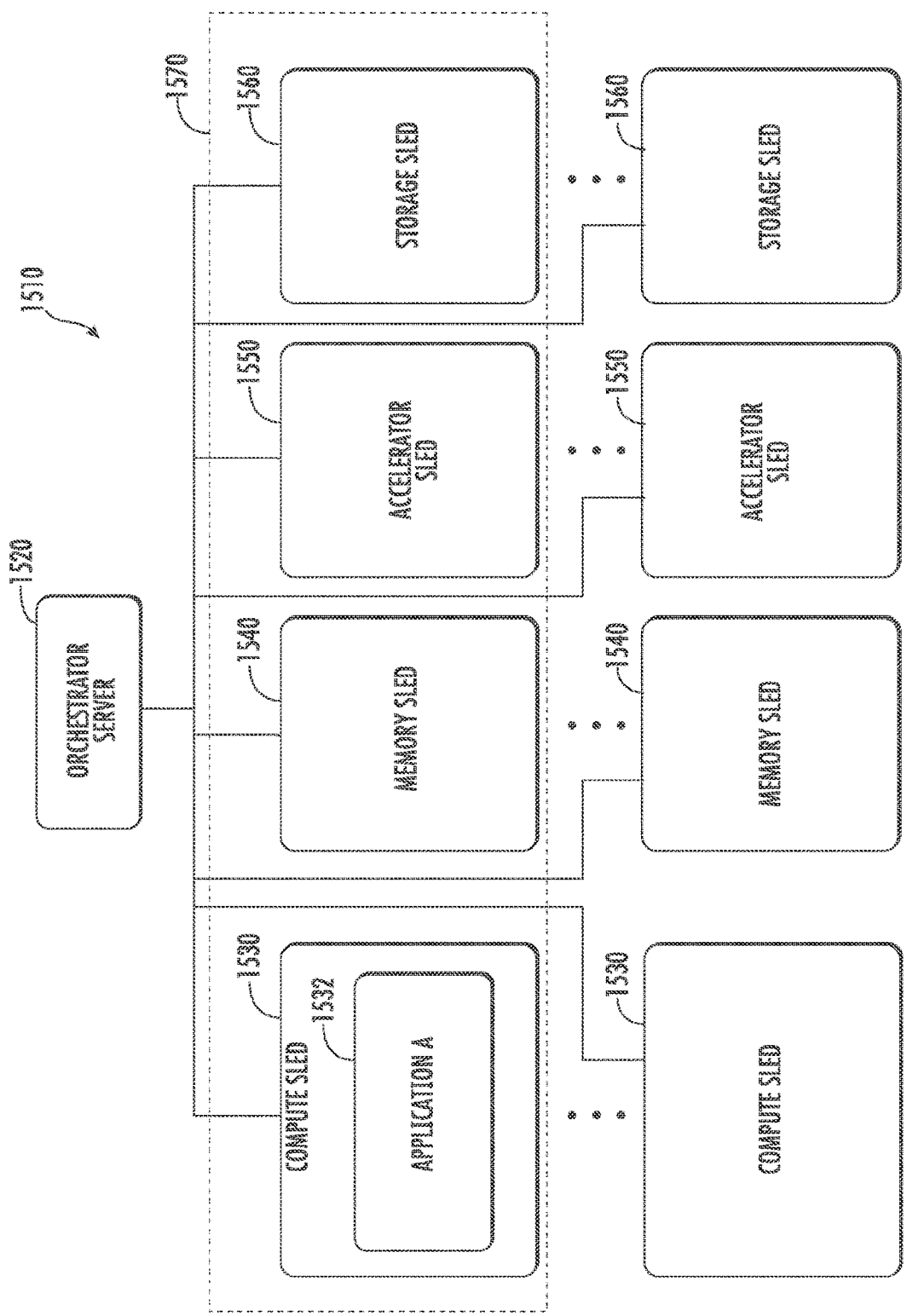
FIG. 15 is a simplified block diagram of a system that may be established within the data center of FIG. 1 to execute workloads with managed nodes composed of disaggregated resources, in accordance with an embodiment of the disclosure.

Referring now to FIG. 15, a system for executing one or more workloads (e.g., applications) may be implemented in accordance with the data center 100. In the illustrative embodiment, the system 1510 includes an orchestrator server 1520, which may be embodied as a managed node including a compute device (e.g., a processor 820 on a compute sled 800) executing management software (e.g., a cloud operating environment, such as OpenStack) that is communicatively coupled to multiple sleds 400 including a large number of compute sleds 1530 (e.g., each similar to the compute sled 800), memory sleds 1540 (e.g., each similar to the memory sled 1400), accelerator sleds 1550 (e.g., each similar to the memory sled 1000), and storage sleds 1560 (e.g., each similar to the storage sled 1200). One or more of the sleds 1530, 1540, 1550, 1560 may be grouped into a managed node 1570, such as by the orchestrator server 1520, to collectively perform a workload (e.g., an application 1532 executed in a virtual machine or in a container). The managed node 1570 may be embodied as an assembly of physical resources 620, such as processors 820, memory devices 720, accelerator circuits 1020, or data storage 1250, from the same or different sleds 400. Further, the managed node may be established, defined, or "spun up" by the orchestrator server 1520 at the time a workload is to be assigned to the managed node or at any other time, and may exist regardless of whether any workloads are presently assigned to the managed node. In the illustrative embodiment, the orchestrator server 1520 may selectively allocate and/or deallocate physical resources 620 from the sleds 400 and/or add or remove one or more sleds 400 from the managed node 1570 as a function of quality of service (QoS) targets (e.g., performance targets associated with a throughput, latency, instructions per second, etc.) associated with a service level agreement for the workload (e.g., the application 1532). In doing so, the orchestrator server 1520 may receive telemetry data indicative of performance conditions (e.g., throughput, latency, instructions per second, etc.) in each sled 400 of the managed node 1570 and compare the telemetry data to the quality of service targets to determine whether the quality of service targets are being satisfied. The orchestrator server 1520 may additionally determine whether one or more physical resources may be deallocated from the managed node 1570 while still satisfying the QoS targets, thereby freeing up those physical resources for use in another managed node (e.g., to execute a different workload). Alternatively, if the QoS targets are not presently satisfied, the orchestrator server 1520 may determine to dynamically allocate additional physical resources to assist in the execution of the workload (e.g., the application 1532) while the workload is executing. Similarly, the orchestrator server 1520 may determine to dynamically deallocate physical resources from a managed node if the orchestrator server 1520 determines that deallocating the physical resource would result in QoS targets still being met.

Additionally, in some embodiments, the orchestrator server 1520 may identify trends in the resource utilization of the workload (e.g., the application 1532), such as by identifying phases of execution (e.g., time periods in which different operations, each having different resource utilizations characteristics, are performed) of the workload (e.g., the application 1532) and pre-emptively identifying available resources in the data center 100 and allocating them to the managed node 1570 (e.g., within a predefined time period of the associated phase beginning). In some embodiments, the orchestrator server 1520 may model performance based on various latencies and a distribution scheme to place workloads among compute sleds and other resources (e.g., accelerator sleds, memory sleds, storage sleds) in the data center 100. For example, the orchestrator server 1520 may utilize a model that accounts for the performance of resources on the sleds 400 (e.g., FPGA performance, memory access latency, etc.) and the performance (e.g., congestion, latency, bandwidth) of the path through the network to the resource (e.g., FPGA). As such, the orchestrator server 1520 may determine which resource(s) should be used with which workloads based on the total latency associated with each potential resource available in the data center 100 (e.g., the latency associated with the performance of the resource itself in addition to the latency associated with the path through the network between the compute sled executing the workload and the sled 400 on which the resource is located).

In some embodiments, the orchestrator server 1520 may generate a map of heat generation in the data center 100 using telemetry data (e.g., temperatures, fan speeds, etc.) reported from the sleds 400 and allocate resources to managed nodes as a function of the map of heat generation and predicted heat generation associated with different workloads, to maintain a target temperature and heat distribution in the data center 100. Additionally or alternatively, in some embodiments, the orchestrator server 1520 may organize received telemetry data into a hierarchical model that is indicative of a relationship between the managed nodes (e.g., a spatial relationship such as the locations of the resources of the managed nodes within the data center 100 and/or a functional relationship, such as groupings of the managed nodes by the customers the managed nodes provide services for, the types of functions typically performed by the managed nodes, managed nodes that typically share or exchange workloads among each other, etc.). Based on differences in the locations and resources in the managed nodes, a given workload may exhibit different resource utilizations (e.g., cause a different internal temperature, use a different percentage of processor or memory capacity) across the resources of different managed nodes. The orchestrator server 1520 may determine the differences based on the telemetry data stored in the hierarchical model and factor the differences into a prediction of future resource utilization of a workload if the workload is reassigned from one managed node to another managed node, to accurately balance resource utilization in the data center 100.

To reduce the computational load on the orchestrator server 1520 and the data transfer load on the network, in some embodiments, the orchestrator server 1520 may send self-test information to the sleds 400 to enable each sled 400 to locally (e.g., on the sled 400) determine whether telemetry data generated by the sled 400 satisfies one or more conditions (e.g., an available capacity that satisfies a predefined threshold, a temperature that satisfies a predefined threshold, etc.). Each sled 400 may then report back a simplified result (e.g., yes or no) to the orchestrator server 1520, which the orchestrator server 1520 may utilize in determining the allocation of resources to managed nodes.

Figure 16:
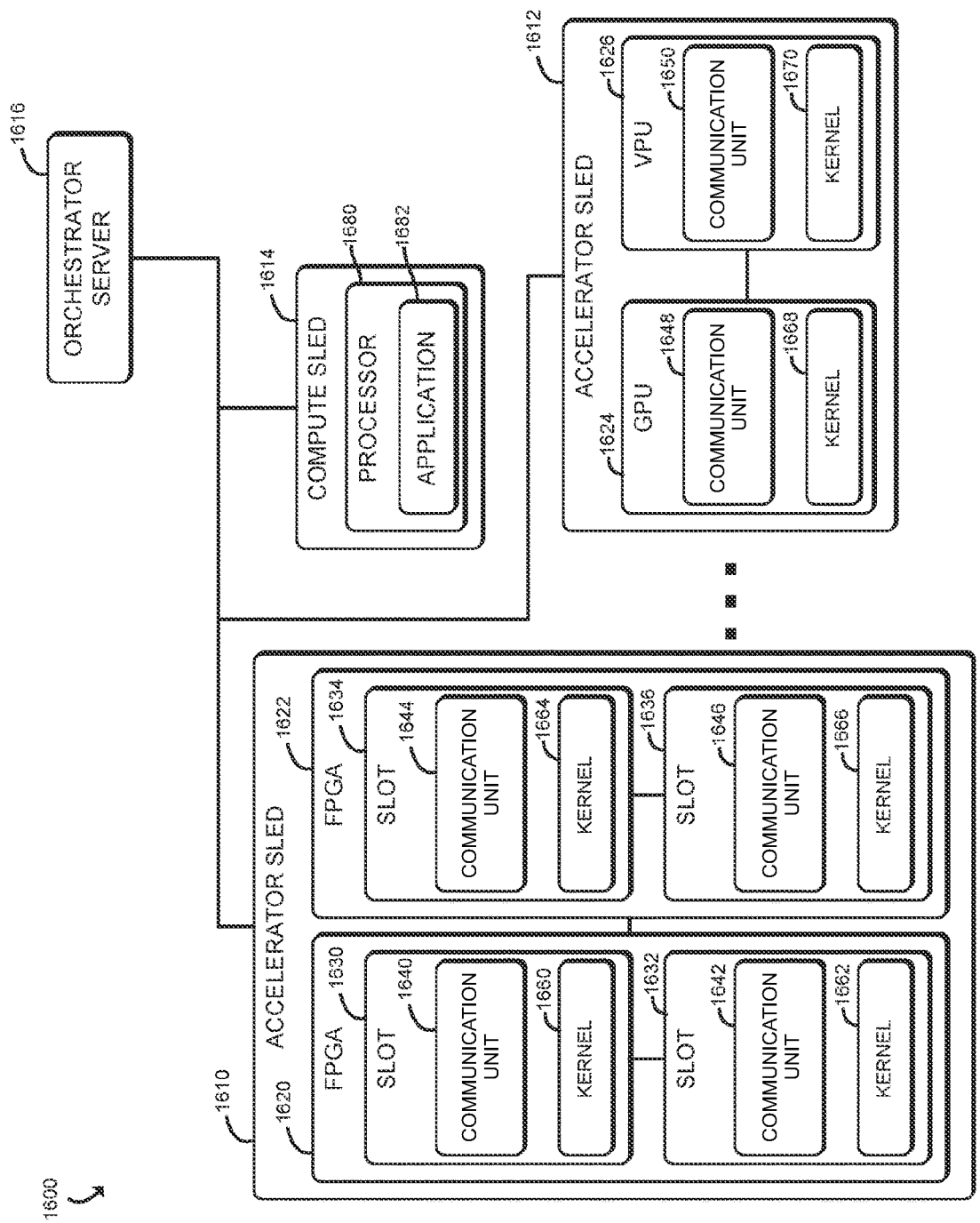
FIG. 16 is a simplified diagram of at least one embodiment of a system for providing I/O channel for accelerator device kernels, in accordance with an embodiment of the disclosure.

Referring now to FIG. 16, a system 1600 for providing I/O channel for accelerator device kernels includes multiple accelerator sleds 1610, 1612, and a compute sled 1614 in communication with each other and with an orchestrator server 1616, which may also be referred to as a telemetry service device. Each accelerator sled 1610, 1612 is similar to the accelerator sled 1000 of FIG. 10. While two accelerator sleds 1610, 1612 are shown for clarity, it should be understood that the system 1600 may have a different number of accelerator sleds (e.g., tens, hundreds, or thousands) and may include other types of sleds (memory, storage, etc.). In the illustrative embodiment, the accelerator sled 1610 includes two accelerator devices 1620, 1622, similar to the accelerator circuits 1020 of the accelerator sled 1000 of FIG. 10. In the illustrative embodiment, each accelerator device 1620, 1622 is an FPGA. However, the accelerator devices 1620, 1622 may include any other suitable programmable logic device. The gates of the FPGA 1620 are partitioned into two slots 1630, 1632 (e.g., each a subset of the gates present in the FPGA 1620). Each slot 1630, 1632 implements a corresponding kernel 1660, 1662, each of which may be embodied as a set of gates configured to perform a set of functions (e.g., operations offloaded from a compute sled, such as the compute sled 1614, to increase the speed at which a workload (e.g., the application 1682 executed by a processor 1680) is performed on behalf of a customer, also referred to herein as a tenant). Additionally, each slot 1630, 1632, in the illustrative embodiment, includes a communication unit 1640, 1642 which may be embodied as any device or circuitry (e.g., a subset of the gates of the corresponding slot 1630, 1632, a processor, a controller, etc.) configured to identify other accelerator devices and accelerator device kernels available in the system 1600, identify communication path(s) between the corresponding kernel 1660, 1662 and the identified accelerator devices and kernels in the system 1600, and selectively establish a logical communication path with one or more of the accelerator devices and their associated kernel (s) (e.g., at the request of the corresponding kernel 1660, 1662). The communication paths are embodied as the underlying buses and networking connections (e.g., PCIe, Ethernet, optical fiber, waveguides, etc.) within an accelerator device, between accelerator devices on the same sled, or between sleds and a logical communication connection is one of the one or more communication paths, exposed by the communication unit 1640, 1642 to the corresponding kernel 1660, 1662. In establishing a logical communication path, a communication unit 1640, 1642, in the illustrative embodiment, determines an amount of communication capacity (e.g., throughput, latency, etc.) to provide to the corresponding kernel 1660, 1662 based on quality of service (QoS) parameters associated with the kernel (e.g., QoS parameters defined in a service level agreement (SLA) between a tenant associated with the kernel 1660, 1662 and an operator of the system 1600, QoS parameters included in a request from the kernel 1660, 1662, etc.). Furthermore, the communication unit 1640, 1642 continually monitors availability data (e.g., provided to the communication unit 1640 by other communication units in the system 1600 and/or based on telemetry data collected by the orchestrator server 1616) indicative of the accelerator devices and kernels available in the system 1600, the latency (e.g., time delays to send and receive data) and congestion (e.g., amount of traffic) on the communication paths, and/or other factors. Additionally, the communication unit 1640, 1642 may continually modify (e.g., reroute) a logical communication path through the available communication paths without burdening the kernel 1660, 1662 with managing the communication details.

The accelerator device 1622 includes slots 1634, 1636, similar to the slots 1630, 1632 described above. Further, each slot 1634, 1636 includes a corresponding kernel 1664, 1666 and communication unit 1644, 1646, similar to the communication units 1640, 1642 described above. Additionally, the accelerator sled 1612 includes accelerators devices 1624 and 1626. The accelerator device 1624, in the illustrative embodiment, is a graphics processing unit (GPU), which may be embodied as any device or circuitry (e.g., a programmable logic chip, a processor, etc.) configured to perform graphics-related computations (e.g., matrix multiplication, vector operations, etc.), and the accelerator device 1626, in the illustrative embodiment, is a vision processing unit (VPU), which may be embodied as any device or circuitry (e.g., a programmable logic chip, a processor, etc.) configured to perform operations related to machine vision, machine learning, and artificial intelligence. Each accelerator device 1624, 1626, in the illustrative embodiment, includes a corresponding kernel 1668, 1670 and communication unit 1648, 1650, similar to the communication units 1640, 1642 described above. While, in the illustrative embodiment, each slot of the accelerator devices 1620, 1622 (FPGAs) includes a corresponding communication unit, in other embodiments, there may be one communication unit per accelerator device, or one unit per sled.

Figure 17:
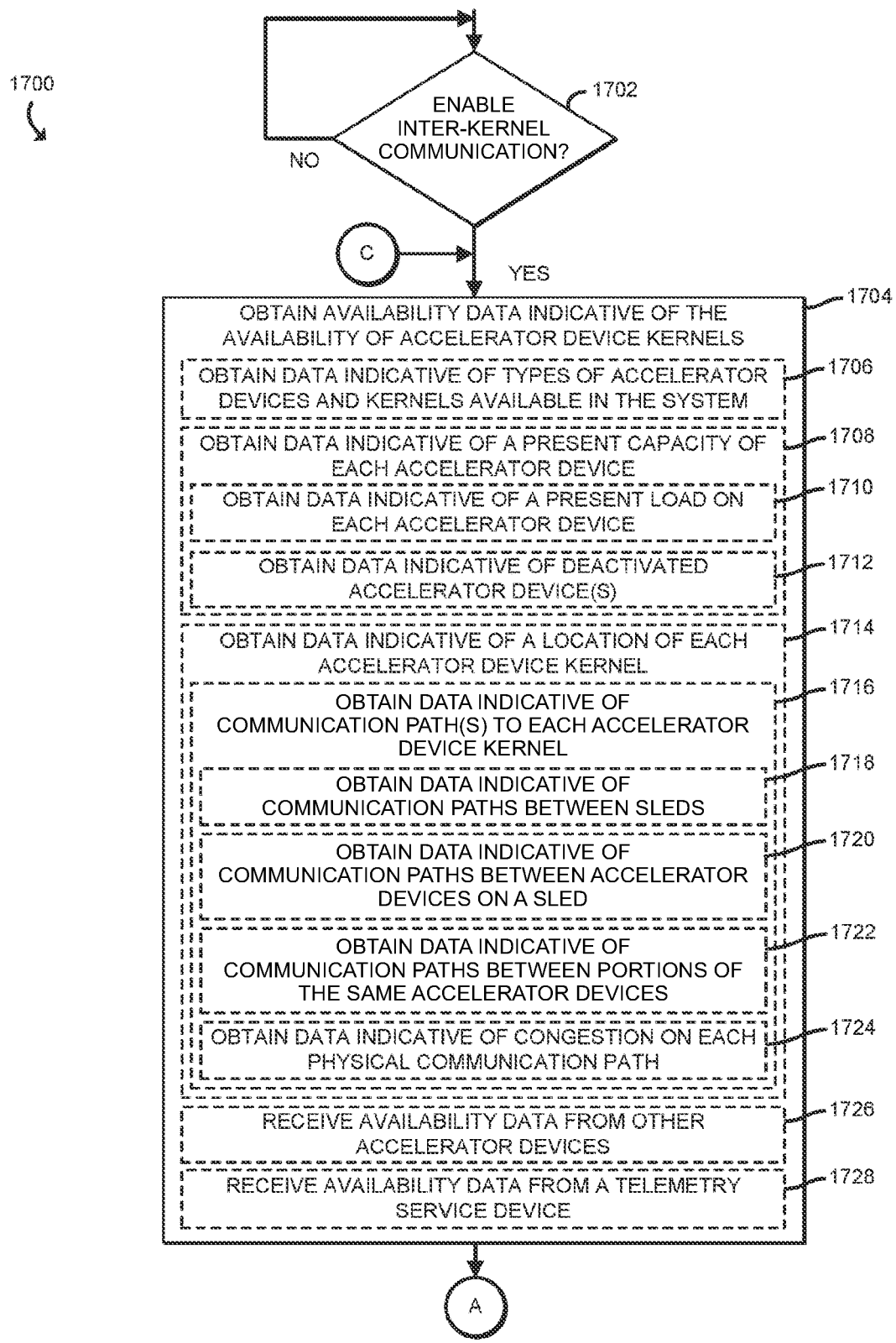
FIGS. 17-20 are a simplified block diagram of at least one embodiment of a method for providing I/O channel for an accelerator device kernel that may be performed by an accelerator device included in the system of FIG. 16, in accordance with an embodiment of the disclosure.

Referring now to FIG. 17, the accelerator device 1620, in operation, may perform a method for providing I/O channel (e.g., inter-kernel communication) for an accelerator device kernel (e.g., the kernel 1660). While the method 1700 is described as being performed by the accelerator device 1620, it should be understood that any other accelerator device 1622, 1624, 1626 may also perform the method 1700. The method 1700 begins with block 1702, in which the accelerator device 1620 (e.g., the communication unit 1640) determines whether to enable inter-kernel communication (e.g., I/O channel). In the illustrative embodiment, the accelerator device 1620 (e.g., the communication unit 1640) may determine to enable inter-kernel communication in response to determining that the accelerator device 1620 is equipped with a communication unit (e.g., the communication unit 1640). In other embodiments, the accelerator device 1620 (e.g., the communication unit 1640) may determine to enable inter-kernel communication based on other factors. Regardless, in response to a determination to enable inter-kernel communication, the method 1700 advances to block 1704 in which the accelerator device 1620 (e.g., the communication unit 1640) obtains availability data indicative of the availability of accelerator device kernels (e.g., of the accelerator devices and the kernels implemented on the accelerator devices) in the system 1600. In doing so, the accelerator device 1620 (e.g., the communication unit 1640) obtains data indicative of types of accelerator devices and kernels available in the system 1600. For example, the accelerator device 1620 (e.g., the communication unit 1640) may receive data indicating that the accelerator sled 1610 includes two accelerator devices 1620, 1622, which are both FPGAs, and that each FPGA 1620, 1622 has two slots 1630, 1632, 1634, 1636 with a corresponding kernel. Further, the availability data, in the illustrative embodiment, indicates the set of functions that the kernel in each slot of each FPGA is capable of performing in block 1706. For example, the availability data, in the illustrative embodiment indicates that the accelerator sled 1612 includes the GPU 1624 and that the corresponding kernel 1668 supports a corresponding set of functions (e.g., matrix multiplication operations), and that the accelerator sled 1612 includes the VPU 1626 and that the corresponding kernel 1670 supports a corresponding set of functions (e.g., object recognition operations, neural network training operations, etc.). Additionally, as indicated in block 1708, the accelerator device 1620 (e.g., the communication unit 1640) may obtain data indicative of a present capacity of each accelerator device 1620, 1622, 1624, 1626 in the system 1600. For example, and as indicated in block 1710, the accelerator device 1620 (e.g., the communication unit 1640) may obtain data indicative of a present load on each accelerator device (e.g., a percentage of total computational throughput being used, a number of operations per second presently being performed, etc.). As indicated in block 1712, the accelerator device 1620 (e.g., the communication unit 1640) may obtain data indicative of deactivated accelerator devices (e.g., accelerator devices with no capacity) in the system 1600.

In the illustrative embodiment, the accelerator device 1620 (e.g., the communication unit 1640) obtains availability data indicative of a location of each accelerator device kernel (e.g., the kernels 1662, 1664, 1666, 1668, 1670) in the system 1600, as indicated in block 1714. The location may include a URL, a MAC address, an IP address, or other identifier for locating the accelerator device kernels 1662, 1664, 1668, 1679. In doing so, the accelerator device 1620 (e.g., the communication unit 1640) may obtain data indicative of communication paths to each accelerator device kernel, as indicated in block 1716. For example, and as indicated in block 1718, the accelerator device 1620 (e.g., the communication unit 1640) obtains data indicative of communication paths between accelerator sleds 1610, 1612 (e.g., an Ethernet connection, an optical fiber connection, a waveguide connection, wireless connections, etc., including any switches or other intermediary devices) or devices outside of the data center 10. The accelerator device 1620 (e.g., the communication unit 1640) may obtain data indicative of communication paths between accelerator devices (e.g., between the accelerator device 1620, 1622) on the same sled (e.g., on the accelerator sled 1610), such as a peripheral component interconnect express (PCIe) bus, a serial interconnect, wireless connection, or other local bus, as indicated in block 1720. As indicated in block 1722, the accelerator device 1620 (e.g., the communication unit 1640) may obtain data indicative of communication paths between portions of the same accelerator device (e.g., between slots 1630, 1632 of the same FPGA 1620). The accelerator device 1620 (e.g., the communication unit 1640) may additionally obtain data indicative of congestion on each communication path (e.g., a latency, an amount of packets sent per second, an amount of data sent per second, a percentage of the total bandwidth of the communication path being used, etc.), as indicated in block 1724. As indicated in block 1726, the accelerator device 1620 (e.g., the communication unit 1640) receives availability data from other accelerator devices (e.g., from the communication units 1642, 1644, 1646, 1648, 1650). Additionally or alternatively, the accelerator device 1620 (e.g., the communication unit 1640) may receive the availability data from a telemetry service device (e.g., the orchestrator server 1616), as indicated in block 1728. Subsequently, the method 1700 advances to block 1730 of FIG. 18, in which the accelerator device 1620 (e.g., the communication unit 1640) sends availability data to other devices in the system 1600.

Figure 18:
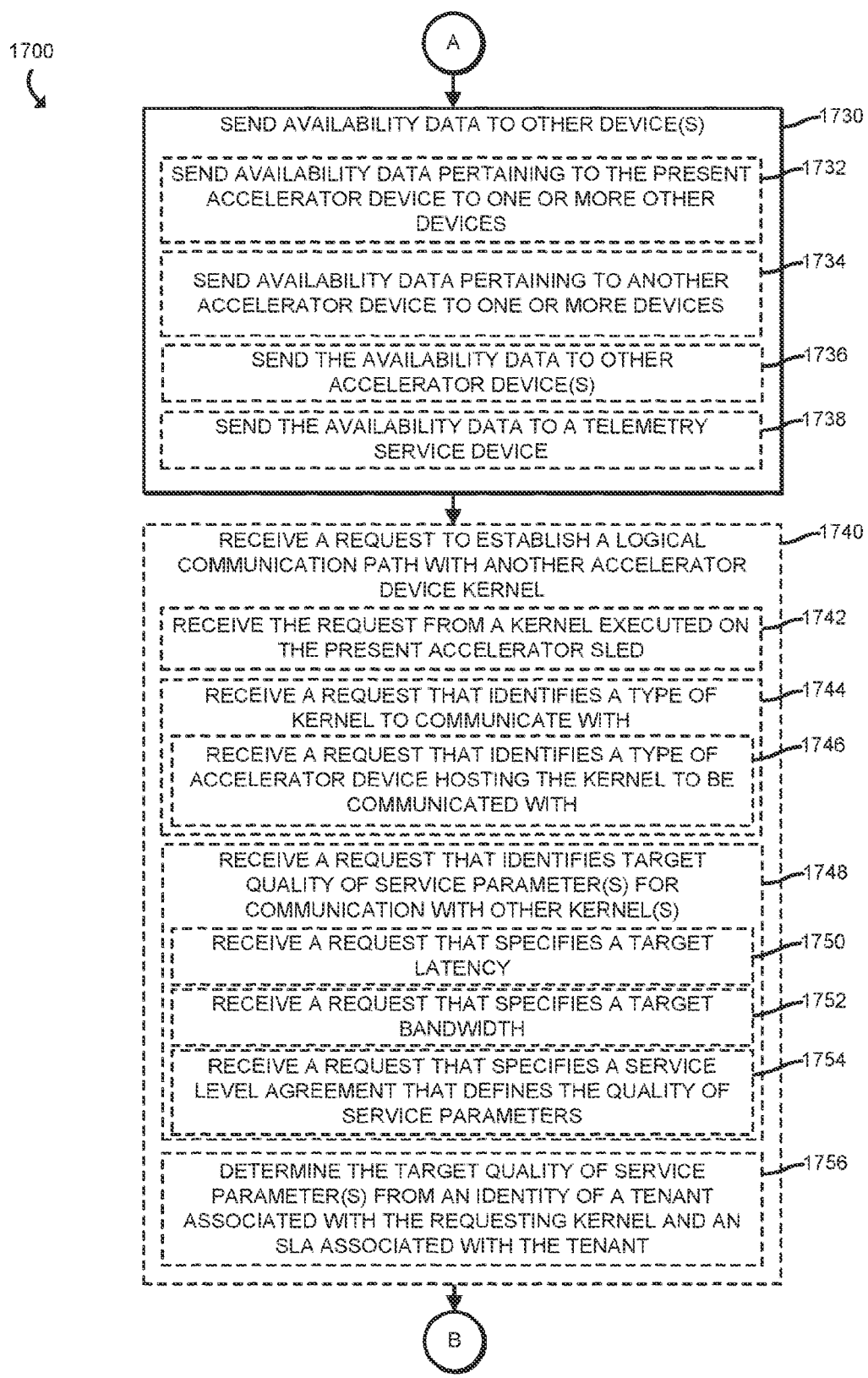

Referring now to FIG. 18, the accelerator device 1620 (e.g., the communication unit 1640), in sending the availability data, may send availability data pertaining to the present accelerator device 1620 to one or more devices, as indicated in block 1732. As indicated in block 1734, the accelerator device 1620 (e.g., the communication unit 1640) may send availability data pertaining to another accelerator device to one or more devices. For example, the accelerator device 1620 (e.g., the communication unit 1640) may send the availability data to other accelerator devices in the system 1600, as indicated in block 1736. As indicated in block 1738, the accelerator device 1620 (e.g., the communication unit 1640) may send the availability data to a telemetry service device (e.g., the orchestrator server 1616).

Still referring to FIG. 18, the accelerator device 1620 (e.g., the communication unit 1640), may receive a request to establish a logical communication path (e.g., a representation of a communication path that maps to one or more communication paths) with another accelerator device kernel (e.g., one or more of kernels 1662, 1666, 1668, 1670), as indicated in block 1740. In doing so, the accelerator device 1620 (e.g., the communication unit 1640) may receive a request from a kernel executed on the present accelerator sled (e.g., the kernel 1660 on the FPGA 1620 of the accelerator sled 1610), as indicated in block 1742. As indicated in block 1744, the accelerator device 1620 (e.g., the communication unit 1640), may receive a request that identifies a type of kernel to communicate with (e.g., data including a name or other identifier of a kernel in the system 1600, data indicative of one or more functions supported by the kernel to be communicated with, etc.). The request may also include data indicative of the type of accelerator device hosting the kernel to be communicated with (e.g., an FPGA, a GPU, a VPU, etc.), as indicated in block 1746. As indicated in block 1748, the accelerator device 1620 (e.g., the communication unit 1640) may receive a request that identifies one or more target quality of service parameters for the requested communication with the other kernel(s). For example, and as indicated in block 1750, the accelerator device 1620 (e.g., the communication unit 1640) may receive a request that specifies a target latency (e.g., a maximum amount of time that may elapse for a packet to be delivered to the other kernel). As indicated in block 1752, the accelerator device 1620 (e.g., the communication unit 1640) may receive a request that specifies a target bandwidth. Additionally or alternatively, the accelerator device 1620 (e.g., the communication unit 1640) may receive a request that references a service level agreement (SLA) that defines one or more quality of service parameters for the logical communication path with the other kernel(s), as indicated in block 1754. As indicated in block 1756, the accelerator device 1620 (e.g., the communication unit 1640) may alternatively determine the target quality of service parameter(s) from an identity of a tenant (e.g., customer) associated with the requesting kernel and an SLA associated with the tenant. Subsequently, the method 1700 advances to block 1758 of FIG. 19, in which the accelerator device 1620 (e.g., the communication unit 1640) determines the subsequent course of action based on whether a request to establish a logical communication path is active (e.g., in block 1740).

Figure 19:
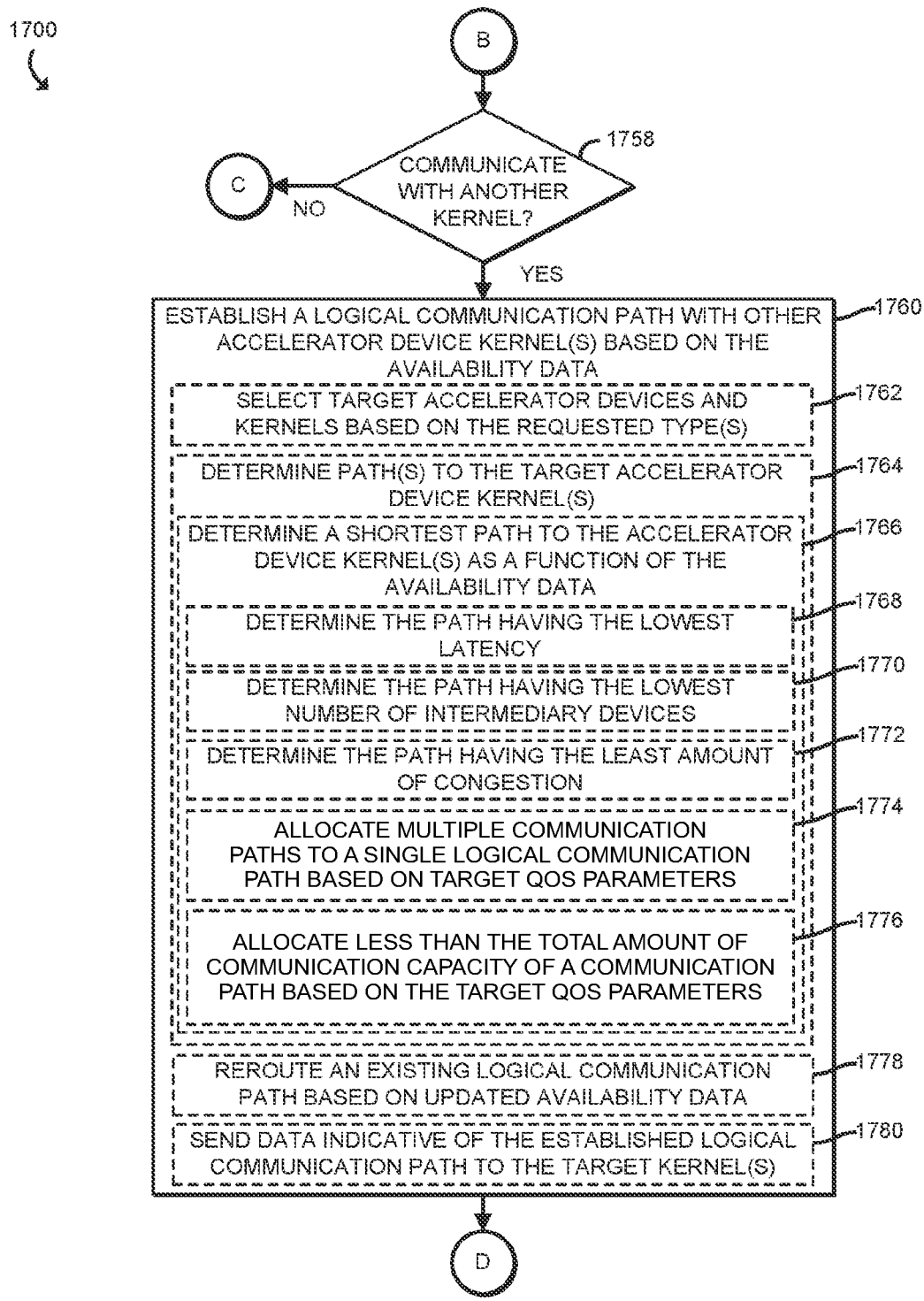

Referring now to FIG. 19, if a request to establish a logical communication path was not received or the accelerator device 1620 is not initiating a request, the method 1700 loops back to block 1704 of FIG. 17, in which the accelerator device 1620 continues to obtain availability data (e.g., from other accelerator devices and/or from the orchestrator server 1616). Otherwise, if a request to establish a logical communication path was received, the method 1700 advances to block 1760, in which the accelerator device 1620 (e.g., the communication unit 1640) establishes a logical communication path with the other accelerator device kernel(s) using the availability data (e.g., the availability data obtained in block 1704 of FIG. 17). In doing so, and as indicated in block 1762, the accelerator device 1620 (e.g., the communication unit 1640) selects target accelerator device(s) (e.g., accelerator devices to communicate with) and corresponding kernels, based on the requested types (e.g., the accelerator device type and kernel type from blocks 1744, 1746). In block 1764, the accelerator device 1620 (e.g., the communication unit 1640), determines path(s) to the target accelerator device kernel(s). In doing so, and as indicated in block 1766, the accelerator device 1620 (e.g., the communication unit 1640) may determine a shortest path to the accelerator device kernel(s) as a function of the availability data. As indicated in block 1768, the accelerator device 1620 (e.g., the communication unit 1640) may determine a path having the lowest latency. Additionally or alternatively, the accelerator device 1620 (e.g., the communication unit 1640) may determine the path having the lowest number of intermediary devices (e.g., switches, other accelerator devices through which the target accelerator device is connected to the accelerator device 1620, etc.), as indicated in block 1770. Additionally or alternatively, the accelerator device 1620 (e.g., the communication unit 1640) may determine the path having the least amount of congestion, as indicated in block 1772. In block 1774, the accelerator device 1620 (e.g., the communication unit 1640) may allocate multiple communication paths to a single logical communication path based on the target quality of service parameters (e.g., combining multiple communication paths to obtain a target bandwidth). As indicated in block 1776, the accelerator device 1620 (e.g., the communication unit 1640)

may allocate less than the total amount of communication capacity of a given communication path to the logical communication path, based on the target quality of service parameters (e.g., the target bandwidth is less than the total available bandwidth of a given communication path). As indicated in block 1778, the accelerator device 1620 (e.g., the communication unit 1640) may reroute an existing logical communication path (e.g., to utilize different communication path(s), to utilize more of the available capacity of a communication path, etc.), to maintain a target quality of service (e.g., a target bandwidth, a target latency, etc.). In the illustrative embodiment, the accelerator device 1620 (e.g., the communication unit 1640) sends data indicative of the established logical communication path (e.g., the selected communication path(s) and the capacities of the communication path(s) to be allocated to a given logical communication path) to the target kernels (e.g., to the communication unit 1642, 1646, 1648, 1650 associated with the target kernel), as indicated in block 1780. Subsequently, the method 1700 advances to block 1782 of FIG. 20, in which the accelerator device 1620 (e.g., the communication unit 1640) communicates data between accelerator device kernels using the established logical communication path(s).

Figure 20:
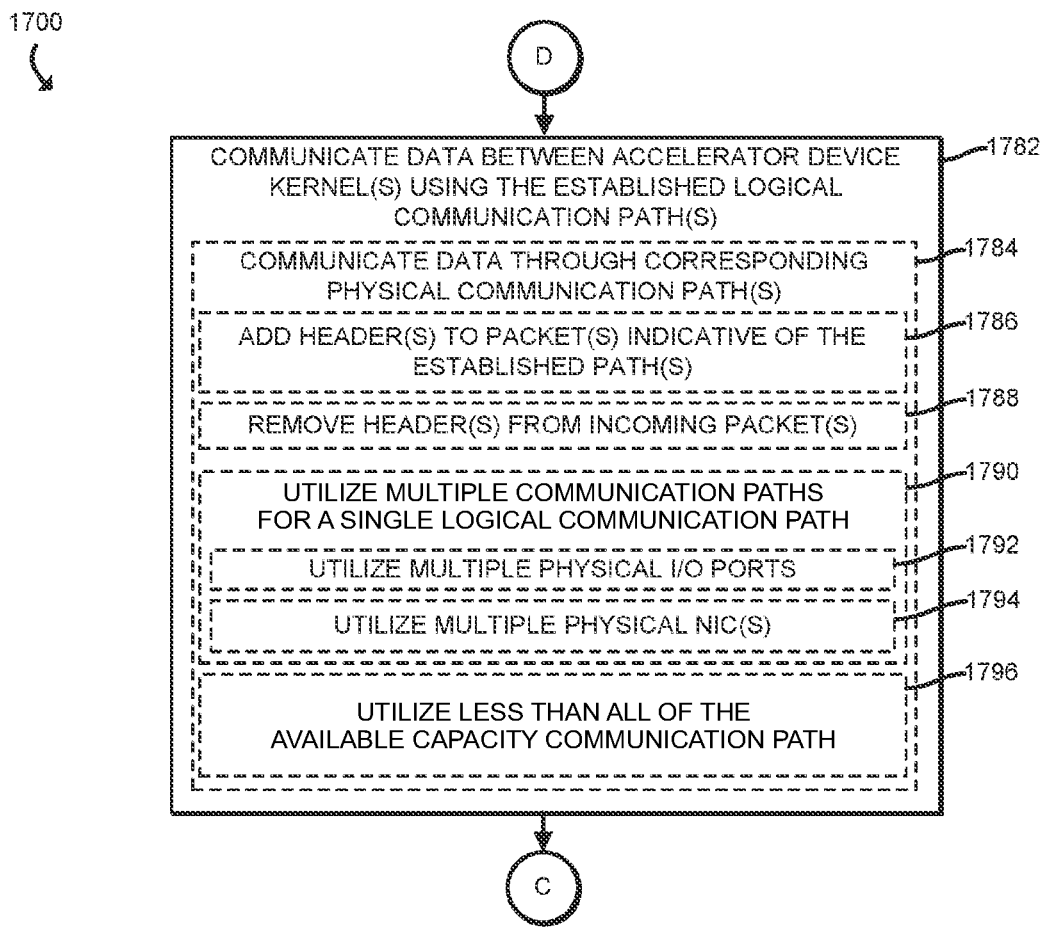

Referring now to FIG. 20, in communicating the data, the accelerator device 1620 (e.g., the communication unit 1640) communicates data through the corresponding communication path(s), as indicated in block 1784. In doing so, the accelerator device 1620 (e.g., the communication unit 1640) may add one or more headers to packets associated with the established logical communication path(s) (e.g., routing data to enable the packet(s) to travel through the corresponding communication path(s) to the target kernel(s)), as indicated in block 1786. Additionally, in the illustrative embodiment, the accelerator device 1620 (e.g., the communication unit 1640) may remove headers from incoming packets, as indicated in block 1788. As indicated in block 1790, the accelerator device 1620 (e.g., the communication unit 1640) may utilize multiple communication paths for a single logical communication path. For example, the accelerator device 1620 (e.g., the communication unit 1640) may utilize multiple I/O ports, as indicated in block 1792 and/or may utilize multiple network interface controllers (NICs), as indicated in block 1794. As indicated in block 1796, the accelerator device 1620 (e.g., the communication unit 1640) may utilize less than all of the available capacity of a communication path to communicate data with the target kernel(s). In the illustrative embodiment, the method 1700 subsequently loops back to block 1704 of FIG. 17, to continue to obtain availability data. While shown as being performed in a particular sequence, it should be understood that the operations described with reference to the method 1700 may be performed in a different order and/or concurrently (e.g., the accelerator device 1620 may continually obtain availability data while the accelerator device 1620 is concurrently sending and receiving data between kernels and rerouting logical communication paths through the available communication paths).

Figure 21:
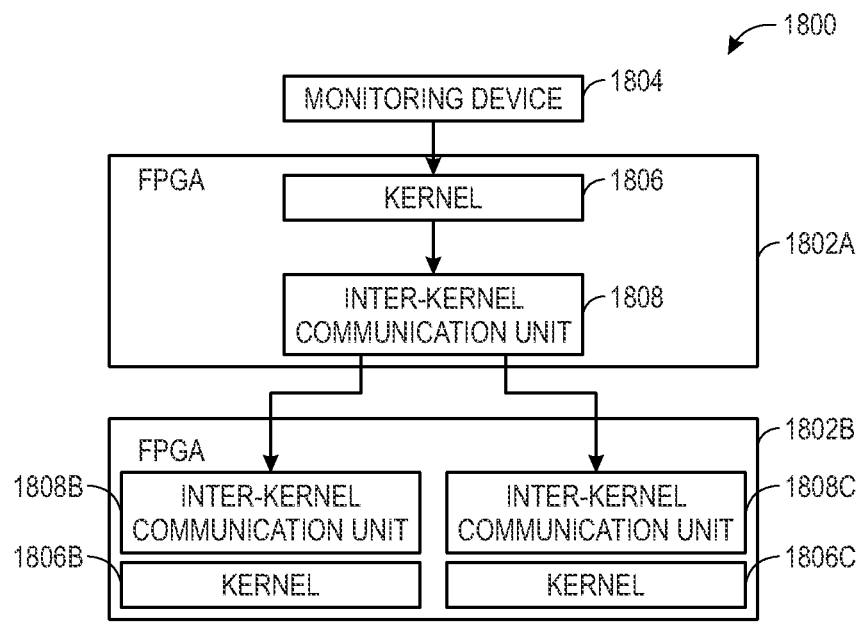
FIG. 21 is a block diagram of a system detailing inter-FPGA communication with expanded inter-kernel communication, in accordance with an embodiment of the disclosure.

The inter-kernel communication may be performed wholly within the data center 10 or may be applied using one or more accelerators outside of the data center 10 using one or more programmable logic devices. FIG. 21 details a block diagram of a system 1800 that implements inter-kernel communication with expanded inter-kernel communications between two FPGAs 1802. A monitoring device 1804 may be configured to send a data downstream to a kernel 1806A of an FPGA 1802A. Such a monitoring device 1804 may include one or more cameras, optical sensors, radar, sonar, or the like that monitors one or more parameters and sends data to the FPGA 1802A. The monitoring device 1804 may or may not be external to the FPGA 1802A. In certain embodiments, the kernel 1806A may have instructions stored within a storage sled 1200 to perform analytics on the data provided by the monitoring device 1804. These instructions may utilize the analytics to generate events. For example, the monitoring device 1804 may contain video data of a street. The instructions may utilize continuous or intermittent analysis to analyze the video data to determine whether a moving vehicle is being captured in the video data. If a moving vehicle is detected, the FPGA 1802A may use the stored analytics to determine a parameter (e.g., the speed) of objects (e.g., the car) in the video data and generate a corresponding event (e.g., CAR_SPEED_DETECTED). Other activation functions may also be activated based on other parameters, such as a temperature sensing may cause a function to be activated when a threshold temperature is crossed. In various other embodiments, the instructions may be modified by an owner or a user with the required credentials to generate various other events from the video data or other monitored data from the monitoring device 1804, such as anomalies in a road surface, a car accident, detection of an illegal vehicle (e.g. scooter), and the like.

After the event is generated, an inter-kernel communication unit 1808A may identify what activation functions to create based on the generated event. The inter-kernel communication unit 1808A may utilize techniques such as, but not limited to, load balancing schemes or conditional activation functions to create the proper activation functions. For example, the inter-kernel communication unit 1808A may utilize the previously discussed availability data to balance load between various kernels 1806 in the system 1800. The inter-kernel communication unit 1808A may have instructions to perform these processes stored in the memory sled 1400. Various other embodiments may have various other generated activation functions for specific purposes. For example, one embodiment may have the inter-kernel communication unit 1808A generate and/or transmit an activation function that include a specific image matching technique to double-check some aspect of a car/driver by the monitoring device 1804. The inter-kernel communication unit 1808A may determine which kernel 1806B or 1806C to activate by respective I/O channels.

The inter-kernel communication unit 1808A may then send the activation function and meta-data concerning the activation function to one or more different FPGAs 1802B or 1802C after generating the activation functions. The communication may be performed using any steps of the method 1700, as described above, or any other suitable techniques. Upon receiving the activation functions from the FPGA 1802A, the inter-kernel communication unit 1808B or 1808C of the recipient FPGA 1802B may wake up or register kernels 1806B or 1806C that are mapped to the received activation function. Once the kernels 1806B or 1806C are activated, they can begin processing the corresponding data streams that are being received from the FPGA 1802A. Consequently, the kernels 1806B or 1806C may begin generating corresponding events based at least in part on the data received in accordance with instructions stored on their respective FPGA 1802B or 1802C.

Figure 22:
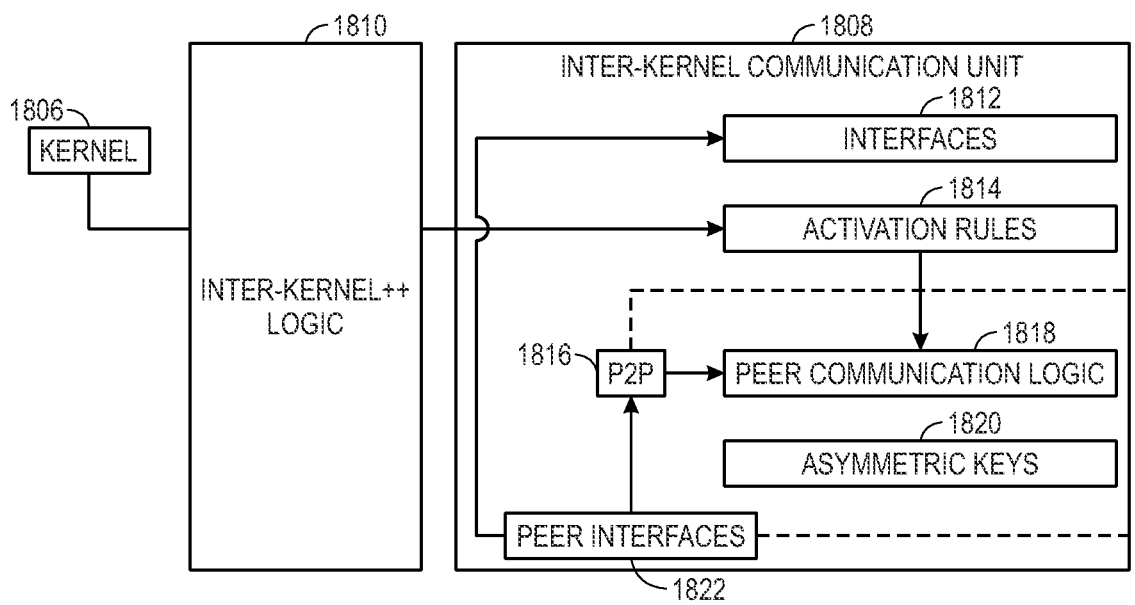
FIG. 22 is a block diagram of the architecture detailing the expanded inter-kernel communication, in accordance with an embodiment of the disclosure.

FIG. 22 is a block diagram of an embodiment of architecture detailing the inter-kernel communication unit 1808 (e.g., 1808A, 1808B, or 1808C). As previously noted, each inter-kernel communication unit 1808 is coupled with a corresponding kernel 1806 that may provide the inter-kernel communication unit 1808 with generated events. Additionally, the inter-kernel communication unit 1808 may also be coupled with an inter-kernel logic 1810 that is responsible for performing inter-kernel communications within a rack 240 and/or within the data center 10. The inter-kernel logic 1810 may include the communication units 1640, 1644, 1648, and/or 1650. The inter-kernel communication unit 1808 may be used to extend inter-kernel communications to peer-to-peer connections and/or other connections beyond the functionality provided by the inter-kernel logic 1810 (e.g., communication between two devices in the same/adjacent racks 240 in the data center 10 and/or between devices in the data center 10) by enabling communications with at least one device outside of the data center 10 using one or more other communication mechanisms not available via the inter-kernel logic 1810.

To enable such extended communications, the inter-kernel communication unit 1808 has a set of interfaces 1812 that enables configuration of the various elements that include the inter-kernel communication unit 1808. At least one of the interfaces 1812 enables registration of a particular activation function rule 1814 when to activate a corresponding function in another device (e.g., accelerator, programmable logic device, etc.). This one or more of the interfaces 1812 may be accessed by the infrastructure owner or any other authorized user with appropriate credentials. This interface(s) 1812 enables the owner to specify parameters of one or more activation rules 1814 stored in memory in the inter-kernel communication unit 1808, including but not limited to an ID, a rule for the ID, an event type, a threshold or a rule definition associated to the activation function to be activated, the activation function itself, and/or a set of peers to whom the activation function is to be propagated when the rule is asserted. The rule for the ID may be used to update or remove a function. As previously discussed, the event type may be generated by the kernel 1806. The threshold or rule definition may be a Boolean rule that uses the data as an input to a function being performed by the kernel 1806.

The inter-kernel communication unit 1808 also includes a peer interface 1815 that may be coupled to and/or included in the interfaces 1812. The peer interface 1815 may be used to communicate with "peers", the peers may be other devices used in processing (e.g., the FPGA 1802B). Additionally or alternatively, the peers may include other devices, such as cars using Cellular V2X, edge servers, other processing resources, or a combination thereof. Moreover, the peer interface 1815 may be used to register a set of asymmetric (e.g., public or private) keys 1820 in the memory of the inter-kernel communication unit 1808 for the list of peers to whom the inter-kernel communication unit 1808 may send activation functions. Like the interface(s) 1812, the peer interface 1815 may have access gated for the interface enabling only the owner or other authorized users with approved credentials to access the peer interface 1815. This peer interface 1815 enables the owner to access an ID of the peer and the asymmetric key 1820 that may be used to secure the transmitted data.

A peer-to-peer (P2P) interface 1816 may be used to couple to a peers' clients. The P2P interface 1816 may be similar to and/or included in the peer interface 1815. The P2P interface 1816 may be used to send the activation functions to the particular client. The P2P interface 1816 may enable access to the activation function ID and a set of parameters or data associated to the activation function. The P2P interface 1816 is coupled to peer communication logic 1818 that may be used to format the data in a packet suitable for communicating with the respective peers. Using the interfaces 1812, the interfaces 1812 may be responsible for processing events coming from the kernel 1806 and activate the inter-kernel communication unit 1808. This activation functionality may use the peer communication logic 1818 to generate messages (e.g., activations functions and data to be processed) to send to the peers.

Figure 23:
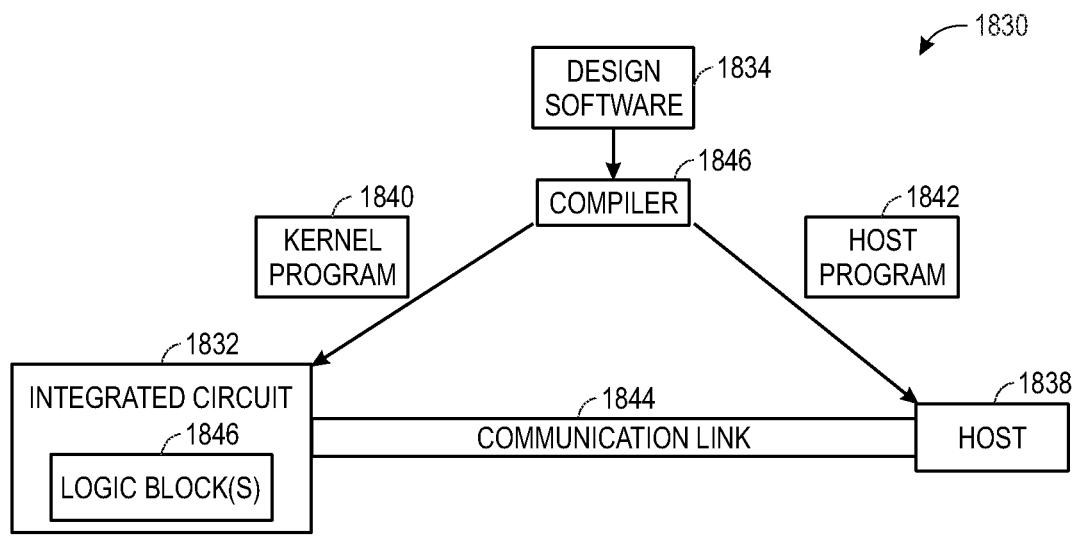
FIG. 23 is a block diagram of a system used to program an integrated circuit, in accordance with an embodiment of the disclosure.

As previously noted, the inter-kernel communication techniques may be at least partially implemented using one or more FPGAs or other programmable logic devices (PLD). FIG. 23 illustrates a block diagram of a system 1830 that may be used to configure an FPGA or PLD. A designer may desire to implement functionality, such as the arithmetic operations of this disclosure, on an integrated circuit device 1832 (e.g., a programmable logic device such as a field-programmable gate array (FPGA) 1802 or an application-specific integrated circuit (ASIC)). In some cases, the designer may specify a high-level program to be implemented, such as an OpenCL program, which may enable the designer to more efficiently and easily provide programming instructions to configure a set of programmable logic cells for the integrated circuit 12 without specific knowledge of low-level hardware description languages (e.g., Verilog or VHDL). For example, since OpenCL is quite similar to other high-level programming languages, such as C++, designers of programmable logic familiar with such programming languages may have a reduced learning curve than designers that are required to learn unfamiliar low-level hardware description languages to implement new functionalities in the integrated circuit device 1832.

The designer may implement high-level designs using design software 1834, such as a version of INTEL® QUARTUS® by INTEL CORPORATION. The design software 1834 may use a compiler 1846 to convert the high-level program into a lower-level description. The compiler 1846 may provide machine-readable instructions representative of the high-level program to a host 1838 and the integrated circuit device 1832. The host 1838 may receive a host program 1842 which may be implemented by the kernel programs 1840 in a respective kernel 1806. To implement the host program 1842, the host 1838 may communicate instructions from the host program 1842 to the integrated circuit device 1832 via a secured communications link 1844, which may be, for example, direct memory access (DMA) communications or peripheral component interconnect express (PCIe) communications. In some embodiments, the kernel programs 1840 and the host 1838 may enable configuration of a logic block 1842 on the integrated circuit device 1832. The logic block 1842 may include circuitry and/or other logic elements and may be configured to implement arithmetic operations, such as addition and multiplication.

The designer may use the design software 1834 to generate and/or to specify a low-level program, such as the low-level hardware description languages described above. Further, in some embodiments, the system 1830 may be implemented without a separate host program 1842. Moreover, in some embodiments, the techniques described herein may be implemented in circuitry as a non-programmable circuit design. Thus, embodiments described herein are intended to be illustrative and not limiting.

Figure 24:
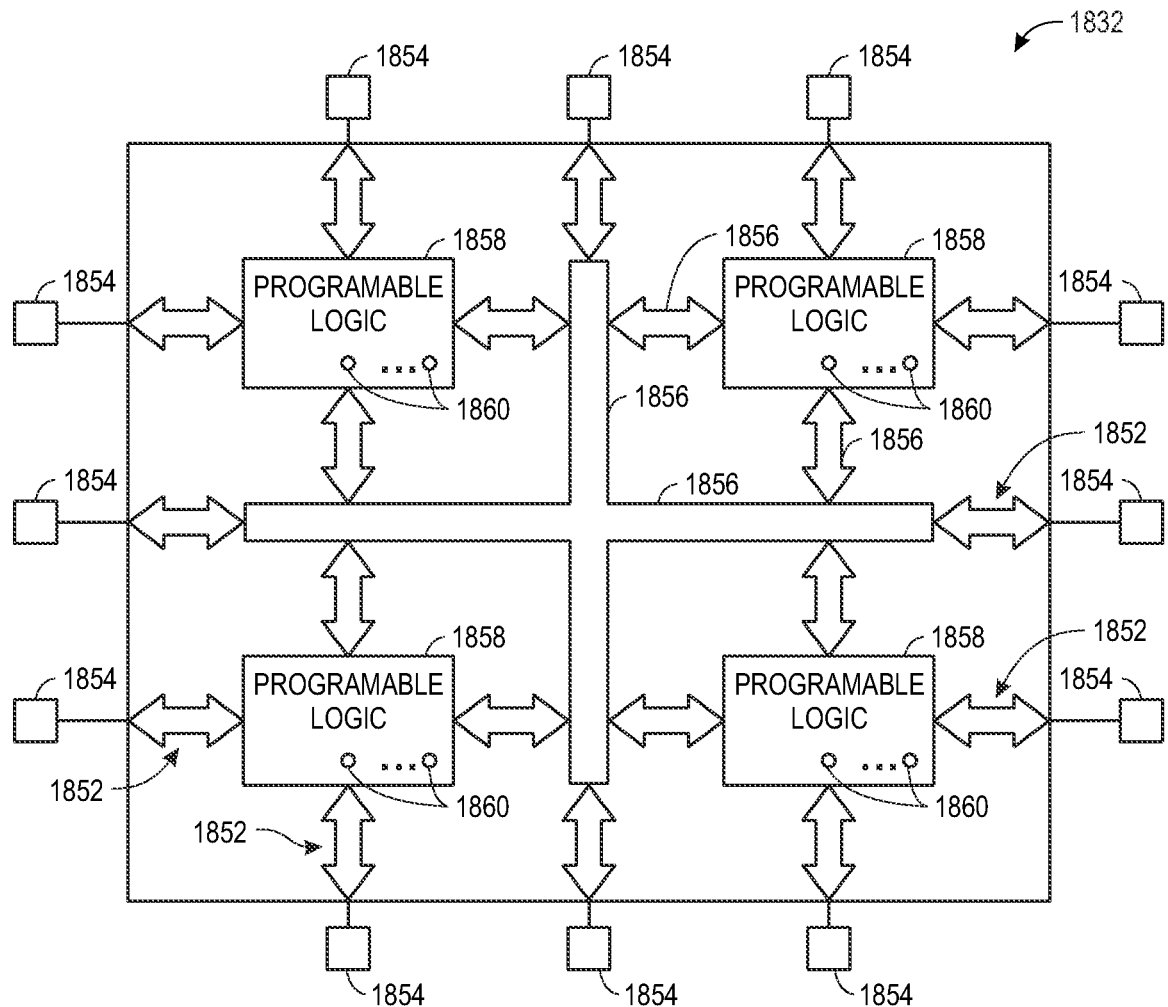
FIG. 24 is a block diagram of the integrated circuit of FIG. 23, in accordance with an embodiment of the disclosure.

Turning now to a more detailed discussion of the integrated circuit device 1832, FIG. 24 is a block diagram of an example of the integrated circuit device 1832 as a programmable logic device, such as a field-programmable gate array (FPGA) 1802. Further, it should be understood that the integrated circuit device 1832 may be any other suitable type of programmable logic device (e.g., an ASIC and/or application-specific standard product). As shown, integrated circuit device 1832 may have input/output circuitry 1852 for driving signals off device and for receiving signals from other devices via input/output pins 1854. Interconnection resources 1856, such as global and local vertical and horizontal conductive lines and buses, may be used to route signals on integrated circuit device 1832. Additionally, interconnection resources 1856 may include fixed interconnects (conductive lines) and programmable interconnects (i.e., programmable connections between respective fixed interconnects). Programmable logic 1858 may include combinational and sequential logic circuitry. For example, programmable logic 1858 may include look-up tables, registers, and multiplexers. In various embodiments, the programmable logic 1858 may be configured to perform a custom logic function. The programmable interconnects associated with interconnection resources may be considered to be a part of programmable logic 1858.

Programmable logic devices, such as the integrated circuit device 1832, may include programmable elements 50 with the programmable logic 1858. For example, as discussed above, a designer (e.g., a customer) may (re)program (e.g., (re)configure) the programmable logic 1858 to perform one or more desired functions. By way of example, some programmable logic devices may be programmed or reprogrammed by configuring programmable elements 1860 using mask programming arrangements, which is performed during semiconductor manufacturing. Other programmable logic devices are configured after semiconductor fabrication operations have been completed, such as by using electrical programming or laser programming to program programmable elements 1860. In general, programmable elements 1860 may be based on any suitable programmable technology, such as fuses, antifuses, electrically-programmable read-only-memory technology, random-access memory cells, mask-programmed elements, and so forth.

Many programmable logic devices are electrically programmed. With electrical programming arrangements, the programmable elements 1860 may be formed from one or more memory cells. For example, during programming, configuration data is loaded into the memory cells using pins 44 and input/output circuitry 1852. In one embodiment, the memory cells may be implemented as random-access-memory (RAM) cells. The use of memory cells based on RAM technology is described herein is intended to be only one example. Further, since these RAM cells are loaded with configuration data during programming, they are sometimes referred to as configuration RAM cells (CRAM). These memory cells may each provide a corresponding static control output signal that controls the state of an associated logic component in programmable logic 1858. For instance, in some embodiments, the output signals may be applied to the gates of metal-oxide-semiconductor (MOS) transistors within the programmable logic 1858.

Keeping the discussion of FIG. 23 and FIG. 24 in mind, a user (e.g., designer) may utilize the design software 1834 to implement the logic block 26 on the programmable logic 1858 of the integrated circuit device 1832. In particular, the designer may specify in a high-level program that mathematical operations such as addition and multiplication be performed. The compiler 1846 may convert the high-level program into a lower-level description that is used to program the programmable logic 1858 to perform addition.

Figure 25:
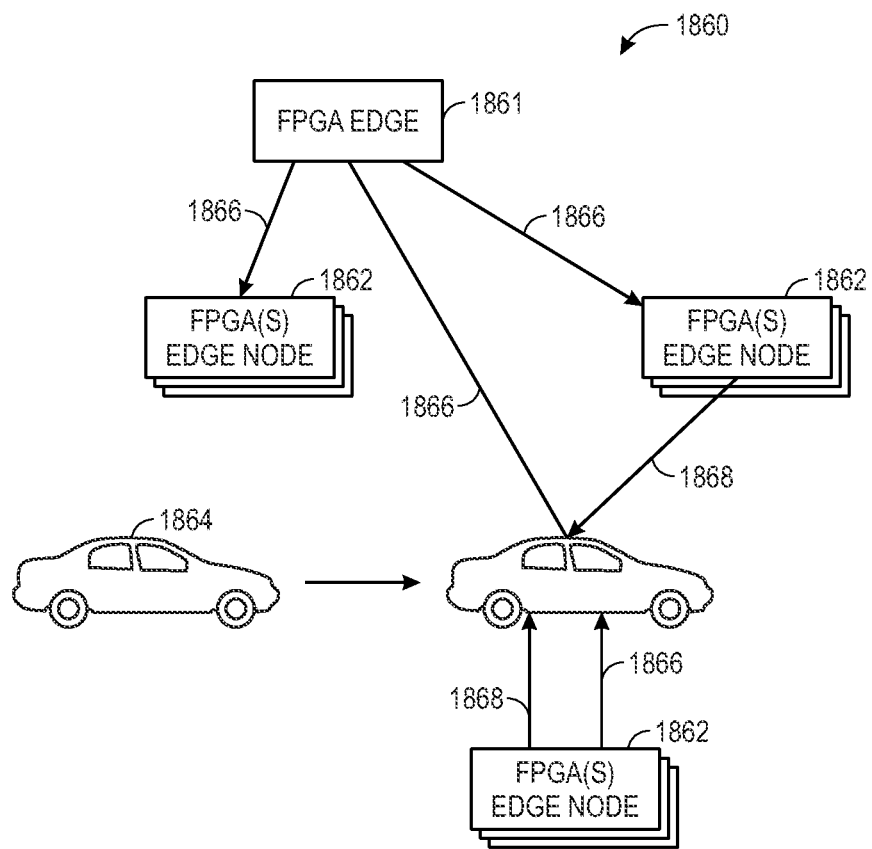
FIG. 25 is a block diagram of a high-level system of an FPGA with expanded inter-kernel communication, in accordance with an embodiment of the disclosure.

Continuing, FIG. 25 is a block diagram of a high level system of expanded Inter-Kernel communication using the foregoing structure. The schematic is representative of a scenario in which the inter-kernel communication unit 1808 may be used, but inter-kernel communication may be implemented in any number of embodiments that are used to perform communications between kernels of different devices. In this scenario, an FPGA device 1861 that includes one or more FPGAs 1802 may be connected to a monitoring device 1804A. The kernel 1806 of the FPGA device 1861 may generate an event, such as CAR_SPEED_DETECTED indicating a detected speed of a car 1862. The FPGA device 1861 sends an indication of the event to the inter-kernel communication unit 1808. The inter-kernel communication unit 1808 may have a rule that defines that when a car speed is between speeds A and B, an activation function is generated to be sent to other FPGAs 1802 in one or more edge nodes 1864 to cause activation of the respective FPGA 1802 to perform a respective function on data from the FGPA device 1861. This activation function is sent to the FPGA 1802 of the one or more edge nodes 1864 via inter-kernel channels 1866.

Once the activation functions are sent to the edge nodes 1864, the edge nodes 1864 may begin performing a function associated with the activation function. For example, in this scenario, the edge nodes 1864 may begin to perform road segmentation. Such road segmentation includes monitoring different segments of the road as to have a larger surveillance area. One or more FPGAs 1802 in the edge nodes 1864 may be responsible for identifying an object or pedestrian on the road. These FPGAs 1802 may have rules that at the same time define that both identified events are to generate activation functions. However, the activation functions may be communicated to the car 1862 via a wireless communication channel 1868. For example, such wireless communication channels 1868 may include V2X communication, other wireless communication (e.g., Bluetooth communications), and the like.

Figure 26:
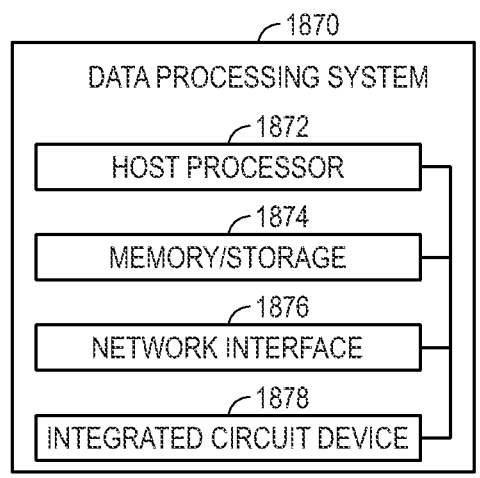
FIG. 26 is a data processing system that may utilize inter-kernel communication, in accordance with an embodiment of the disclosure.

Referring back to the integrated circuit device 1832, the integrated circuit device 1832 may be a data processing system or a component included in a data processing system (e.g., within the data center 10). For example, the integrated circuit device 1832 may be a component of a data processing system 1870 shown in FIG. 26. The data processing system 1870 may include a host processor 1872 (e.g., a central-processing unit (CPU)), memory and/or storage circuitry 1874, and a network interface 1876. The data processing system 1870 may include more or fewer components (e.g., electronic display, user interface structures, application specific integrated circuits (ASICs)). The host processor 1872 may include any suitable processor, such as an INTEL® Xeon® processor or a reduced-instruction processor (e.g., a reduced instruction set computer (RISC), an Advanced RISC Machine (ARM) processor) that may manage a data processing request for the data processing system 1870 (e.g., to perform encryption, decryption, machine learning, video processing, voice recognition, image recognition, data compression, database search ranking, bioinformatics, network security pattern identification, spatial navigation, or the like). The memory and/or storage circuitry 1874 may include random access memory (RAM), read-only memory (ROM), one or more hard drives, flash memory, or the like. The memory and/or storage circuitry 1874 may hold data to be processed by the data processing system. In some cases, the memory and/or storage circuitry 1874 may also store configuration programs (bitstreams) for programming the integrated circuit device 1832. The network interface 1876 may allow the data processing system 1870 to communicate with other electronic devices. The data processing system 1870 may include several different packages or may be contained within a single package on a single package substrate In one example, the data processing system 1870 may be part of a data center that processes a variety of different requests. For instance, the data processing system 1870 may receive a data processing request via the network interface 1876 to perform encryption, decryption, machine learning, video processing, voice recognition, image recognition, data compression, database search ranking, bioinformatics, network security pattern identification, spatial navigation, digital signal processing, or some other specialized task. Some or all of the components of the data processing system 1870 may be virtual machine components running on circuitry (e.g., managed by one or more hypervisors or virtual machine managers). Whether components or virtual machine components, the various components of the data processing system 1870 may be located in the same location or different locations (e.g., on different boards, in different rooms, at different geographic locations). Indeed, the data processing system 1870 may be accessible via a computing service provider (CSP) that may provide an interface to customers to use the data processing system 1870 (e.g., to run programs and/or perform acceleration tasks) in a cloud computing environment.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims. Moreover, the techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

EXAMPLE EMBODIMENT 1. A semiconductor device, comprising:
  a kernel configured to:
  monitor a stream of data;
  determine that an event has occurred; and
  based at least in part on the determination that the event has occurred, transmit an indication of the event; and
  inter-kernel communication circuitry configured to:
  receive the indication;
  based on the indication, determine that an activation function of a plurality of activation functions is to be generated;
  generate the activation function; and
  transmit the activation function to a kernel of another programmable logic device to waken and perform a function using a peer-to-peer connection.

EXAMPLE EMBODIMENT 2. The semiconductor device of example embodiment 1, wherein the inter-kernel communication circuitry is configured to choose the other programmable logic device from a plurality of programmable logic devices based at least in part on the determined event and the activation function.

EXAMPLE EMBODIMENT 3. The semiconductor device of example embodiment 1, wherein the event comprises a threshold for the stream of data being surpassed.

EXAMPLE EMBODIMENT 4. The semiconductor device of example embodiment 1, wherein the inter-kernel communication circuitry is configured to identify an IO channel over which to transmit the activation function.

EXAMPLE EMBODIMENT 5. The semiconductor device of example embodiment 4, wherein the inter-kernel communication circuitry transmits the activation function over the IO channel to the other programmable logic device as a single targeted programmable logic device.

EXAMPLE EMBODIMENT 6. The semiconductor device of example embodiment 4, wherein the inter-kernel communication circuitry broadcasts the activation function over the IO channel a plurality of programmable logic devices including the other programmable logic device.

EXAMPLE EMBODIMENT 7. The semiconductor device of example embodiment 6, wherein the plurality of programmable logic devices are located in a direction of travel indicated in the stream of data.

EXAMPLE EMBODIMENT 8. The semiconductor device of example embodiment 1, wherein the stream of data comprises image data, and the event comprises determining a speed of an automobile or identifying the automobile as corresponding to a particular automobile parameters.

EXAMPLE EMBODIMENT 9. The semiconductor device of example embodiment 8, wherein identifying the automobile comprises matching a license plate, a color, or a make of the automobile to the particular automobile parameters.

EXAMPLE EMBODIMENT 10. The semiconductor device of example embodiment 8, wherein the activation function is configured to cause the other programmable logic device to confirm identification of the automobile.

EXAMPLE EMBODIMENT 11. The semiconductor device of example embodiment 10, wherein confirming identification of the automobile comprises the other programmable logic device utilizing a secondary monitoring device to attempt to independently determine an identification of the automobile.

EXAMPLE EMBODIMENT 12. The semiconductor device of example embodiment 11, wherein the secondary monitoring device comprises an image sensor or camera operably coupled to the other programmable logic device and that is used to capture images including the car.

EXAMPLE EMBODIMENT 13. A programmable logic device, comprising:
  a kernel configured to be in an active state performing a corresponding function or in a sleep state with reduced power consumption;
  first inter-kernel communication circuitry configured to:
  receive an activation function from a second inter-kernel communication circuitry of another programmable logic device;
  in response to receiving the activation function from the second inter-kernel communication circuitry of the other programmable logic device, wake up the kernel from the sleep state to the active state to perform an operation specified in the activation function;
  cause the kernel to process data corresponding to the activation function in the activate state; and
  transmit results of the data processing to the other programmable logic device.

EXAMPLE EMBODIMENT 14. The programmable logic device of example embodiment 13, wherein waking up the kernel comprises registering the kernel to the activation function.

EXAMPLE EMBODIMENT 15. The programmable logic device of example embodiment 13, wherein the activation function is received as a targeted transmission sent only to the programmable logic device.

EXAMPLE EMBODIMENT 16. The programmable logic device of example embodiment 13, wherein the activation function is broadcasted to a plurality of programmable logic devices including the programmable logic device.

EXAMPLE EMBODIMENT 17. The programmable logic device of example embodiment 13, wherein the data comprises image data.

EXAMPLE EMBODIMENT 18. The programmable logic device of example embodiment 17, wherein the data is received at the programmable logic device with the activation function.

EXAMPLE EMBODIMENT 19. The programmable logic device of example embodiment 18, wherein the inter-kernel communication circuitry is configured to causes a camera or image sensor to capture the data in response to the receipt of the activation function.

EXAMPLE EMBODIMENT 20. A semiconductor device, comprising:
a kernel configured to perform one or more operations; and
inter-kernel communication circuitry configured to communicate with other semi-conductor devices based on processing that has been performed in the kernel or is to be performed in the kernel, wherein the inter-kernel communication circuitry comprises:
a memory to store one or more activation rules and one or more security keys, wherein the one or more activation rules are configured to indicate which external kernel in a separate processing device is configured to be targeted with an activation function configured to activate the external kernel to perform a corresponding function, and the one or more security keys are configured to enable access to the external kernel; and
a plurality of interfaces comprising:
a first interface configured to enable communication with the kernel; and
a peer interface configured to enable communication with the external kernel using a peer-to-peer channel corresponding to the separate processing device.

The invention claimed is:
1. A semiconductor device, comprising:
a kernel configured to:
monitor a stream of data;
determine that an event has occurred; and
based at least in part on the determination that the event has occurred, transmit an indication of the event; and
inter-kernel communication circuitry configured to:
receive the indication;
based on the indication, determine that an activation function of a plurality of activation functions is to be generated;
generate the activation function;
identify an IO channel; and
transmit the activation function over the IO channel to a kernel of another programmable logic device to waken from a sleep state and perform a function using a peer-to-peer connection, wherein the inter-kernel communication circuitry broadcasts the activation function over the IO channel to a plurality of programmable logic devices including the other programmable logic device, wherein the plurality of programmable logic devices are located in a direction of travel for an automobile corresponding to the stream of data, wherein the direction of travel is indicated in the stream of data.

2. The semiconductor device of claim 1, wherein the inter-kernel communication circuitry is configured to choose the other programmable logic device from a plurality of programmable logic devices based at least in part on the determined event and the activation function.

3. The semiconductor device of claim 1, wherein the event comprises a threshold for the stream of data being surpassed.

4. The semiconductor device of claim 1, wherein the inter-kernel communication circuitry transmits the activation function over the IO channel to the other programmable logic device as a single targeted programmable logic device that is the sole programmable logic device targeted by the transmission of the activation function.

5. The semiconductor device of claim 1, wherein the stream of data comprises image data, and the event comprises determining a speed of an automobile or identifying the automobile as corresponding to particular automobile parameters.

6. The semiconductor device of claim 5, wherein identifying the automobile comprises matching a license plate, a color, or a make of the automobile to the particular automobile parameters.

7. The semiconductor device of claim 5, wherein the activation function is configured to cause the other programmable logic device to confirm identification of the automobile.

8. The semiconductor device of claim 7, wherein confirming identification of the automobile comprises the other programmable logic device utilizing a secondary monitoring device to attempt to independently determine an identification of the automobile.

9. The semiconductor device of claim 8, wherein the secondary monitoring device comprises an image sensor or camera operably coupled to the other programmable logic device and that is used to capture images including the automobile.

10. A programmable logic device, comprising:
a kernel configured to have two selectable states, the two selectable states comprising an active state performing a corresponding function and a sleep state with reduced power consumption;
first inter-kernel communication circuitry configured to:
receive an activation function from a second inter-kernel communication circuitry of another programmable logic device;
in response to receiving the activation function from the second inter-kernel communication circuitry of the other programmable logic device, wake up the kernel from the sleep state to the active state to perform an operation specified in the activation function;
cause a camera or image sensor to capture image data in response to the receipt of the activation function;
cause the kernel to process the image data from the camera or image sensor corresponding to the activation function in the active state; and
transmit results of the data processing to the other programmable logic device.

11. The programmable logic device of claim 10, wherein waking up the kernel comprises registering the kernel to the activation function.

12. The programmable logic device of claim 10, wherein the activation function is received as a targeted transmission sent only to the programmable logic device.

13. The programmable logic device of claim 10, wherein the activation function is broadcasted to a plurality of programmable logic devices including the programmable logic device.

14. A semiconductor device, comprising:
a kernel configured to monitor a stream of data, determine that an event has occurred, and based at least in part on the determination that the event has occurred, transmit an indication of the event, wherein the stream of data comprises image data, and the event comprises determining a speed of an automobile or identifying the automobile as corresponding to particular automobile parameters, wherein identifying the automobile comprises matching a license plate, a color, or a make of the automobile to the particular automobile parameters; and
inter-kernel communication circuitry configured to communicate with other semi-conductor devices based on processing that has been performed in the kernel or is to be performed in the kernel, wherein the inter-kernel communication circuitry comprises:
a memory to store one or more activation rules and one or more security keys, wherein the one or more activation rules are configured to indicate which external kernel in a separate processing device is configured to be targeted with an activation function configured to activate the external kernel from a sleep state to perform a corresponding function, and the one or more security keys are configured to enable access to the external kernel;
a plurality of interfaces comprising:
a first interface configured to enable communication with the kernel; and
a peer interface configured to enable communication with the external kernel using a peer-to-peer channel corresponding to the separate processing device; and
one or more processors to:
receive the indication of the event; and
based on receiving the indication, transmit the activation function to the separate processing device.

15. The semiconductor device of claim 14, wherein the activation function is configured to cause the separate processing device to confirm identification of the automobile.

16. The semiconductor device of claim 15, wherein confirming identification of the automobile comprises the separate processing device utilizing a secondary monitoring device to attempt to independently determine an identification of the automobile.

17. The semiconductor device of claim 16, wherein the separate processing device comprises a separate image sensor or camera operably coupled to the separate processing device and that is used to capture images including the automobile.

18. The semiconductor device of claim 14, wherein the processor is to identify an IO channel in the peer interface.

19. The semiconductor device of claim 18, wherein transmitting the activation function comprises transmitting the activation function using the IO channel.

20. The semiconductor device of claim 14, wherein the activation function is configured to cause the separate processing device to activate a camera or image sensor to capture image data based on the activation function.

* * * * *